(12) United States Patent
Hiemstra et al.

(10) Patent No.: US 10,742,250 B1
(45) Date of Patent: Aug. 11, 2020

(54) ELECTRONIC DEVICES HAVING INTEGRATED ANTENNA STRUCTURES

(71) Applicant: Apple Inc., Cupertino, CA (US)

(72) Inventors: Daniel J. Hiemstra, San Jose, CA (US); Jayesh Nath, Milpitas, CA (US); Timothy B. Ogilvie, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/584,156

(22) Filed: Sep. 26, 2019

(51) Int. Cl.
| | |
|---|---|
| H04B 1/034 | (2006.01) |
| H04B 1/3827 | (2015.01) |
| H04B 5/02 | (2006.01) |
| H01Q 7/00 | (2006.01) |
| H04B 1/40 | (2015.01) |
| H01Q 1/27 | (2006.01) |
| H01Q 1/38 | (2006.01) |
| H04B 5/00 | (2006.01) |

(52) U.S. Cl.
CPC ............ *H04B 1/385* (2013.01); *H01Q 1/273* (2013.01); *H01Q 1/38* (2013.01); *H01Q 7/00* (2013.01); *H04B 1/40* (2013.01); *H04B 5/0081* (2013.01); *H04B 5/02* (2013.01)

(58) Field of Classification Search
CPC ........ H04B 1/385; H04B 1/40; H04B 5/0081; H04B 5/02; H01Q 1/273; H01Q 1/38; H01Q 7/00
See application file for complete search history.

(56) References Cited

U.S. PATENT DOCUMENTS

| | | | |
|---|---|---|---|
| 8,202,238 B2 | 6/2012 | Yamazaki et al. | |
| 9,419,339 B2 | 8/2016 | Kamgaing et al. | |
| 9,496,600 B2* | 11/2016 | Irci | H01Q 1/24 |
| 9,622,556 B2 | 4/2017 | Fathollahi et al. | |
| 10,050,332 B2* | 8/2018 | Kim | H01Q 21/50 |
| 10,476,170 B2* | 11/2019 | Rajagopalan | H01Q 21/245 |
| 2015/0102965 A1* | 4/2015 | Irci | H01Q 1/24 |
| | | | 343/702 |
| 2016/0125210 A1* | 5/2016 | Potyrailo | G06K 7/10366 |
| | | | 340/10.1 |
| 2017/0038641 A1 | 2/2017 | Yamazaki | |
| 2019/0384062 A1* | 12/2019 | Wilson | G02B 27/0172 |

* cited by examiner

*Primary Examiner* — Sonny Trinh
(74) *Attorney, Agent, or Firm* — Treyz Law Group, P.C.; Tianyi He; Michael H. Lyons

(57) ABSTRACT

An electronic device may include a display formed at a front face and a backside circuitry module formed at a rear face that opposes the front face. The backside circuitry module may be surrounded by coil structures and may be aligned with a protrusion in a rear wall housing at the rear face. The backside circuitry module may include a substrate to which sensor components or other components may be mounted. In particular, sensor circuitry, sensors, transceiver circuitry, connector circuitry, etc. may be mounted to the substrate. Antenna structures may be embedded within the substrate along with conductive paths for the sensor components and other components mounted to the substrate. Support structures in the backside circuitry module may support the substrate, sensor components, and other components. If desired, antenna structures may be formed on the support structures.

20 Claims, 10 Drawing Sheets

US 10,742,250 B1

ELECTRONIC DEVICES HAVING INTEGRATED ANTENNA STRUCTURES

BACKGROUND

This relates to electronic devices, and more particularly, to electronic devices with wireless circuitry.

Electronic devices are often provided with wireless communications capabilities. To satisfy consumer demand for small form factor electronic devices, manufacturers are continually striving to implement wireless circuitry such as antenna components using compact structures.

At the same time, larger antenna volumes generally allow antennas to exhibit greater efficiency bandwidth. In addition, because antennas have the potential to interfere with each other and with other components in a wireless device, care must be taken when incorporating antennas into an electronic device to ensure that the antennas and wireless circuitry are able to exhibit satisfactory performance over a wide range of operating frequencies.

It would therefore be desirable to be able to provide improved wireless circuitry for electronic devices.

SUMMARY

An electronic device such as a wristwatch may have a front face and rear face. A display may be disposed at the front face and a dielectric rear housing wall (member) may be disposed at the rear face. A backside circuitry module may be formed over the rear housing wall. The backside circuitry module may include a (printed circuit) substrate, sensor components, sensor circuitry and other components. Support structures may be interposed between the substrate and the dielectric housing member. The substrate, sensor components, and sensor circuitry may be mounted to the support structures. Coil structures may surround the backside circuitry module. The substrate may include an opening that accommodates for and/or is aligned with the sensor components and sensor circuitry. The support structures may have one or more openings that accommodates for and/or is aligned with the sensor components and sensor circuitry.

In some configurations, an antenna may include a first antenna resonating element embedded within the substrate and a second antenna resonating element embedded within the substrate. The first and second antenna resonating elements may be formed on opposing sides of the substrate (e.g., on opposing sides of the opening in the substrate). The first and second antenna maybe aligned with respective first and second antenna apertures defined by the support structures and the coil structures. The first and second antenna resonating element may be coupled to radio-frequency transceiver circuitry such as near-field communications transceiver circuitry operable to convey radio-frequency antenna signals above 10 GHz through the first and second antenna apertures and the rear housing wall using the first and second antenna resonating elements.

The radio-frequency transceiver circuitry may be mounted on a top surface of the substrate. A first plurality of (metal and dielectric) layers may be formed in the substrate and may be stacked from a bottom surface of the substrate towards the top surface of the substrate. The plurality of layers may form the antenna resonating element. A second plurality of (metal and dielectric) layers may be formed in the substrate and interposed between the plurality of layers and the top surface of the substrate. The additional plurality of layers forming a radio-frequency transmission line coupled to the antenna resonating element.

In some configurations, an antenna may include a first and second antenna resonating elements formed on opposing sides of a dielectric support structure and/or formed on opposing sides of an opening in the dielectric support structure. The opening in the dielectric support structure may accommodate, surround, and/or be aligned with sensor components and sensor circuitry. The dielectric support structure may include first and second protruding portions that extend away from the opening (e.g., away from the sensor components and sensor circuitry). The first and second antenna resonating elements may be formed on respective bottom surfaces of the first and second protruding portions of the dielectric support structure and may be separated from the rear housing wall by corresponding first and second gaps.

DETAILED DESCRIPTION

Figure 1:
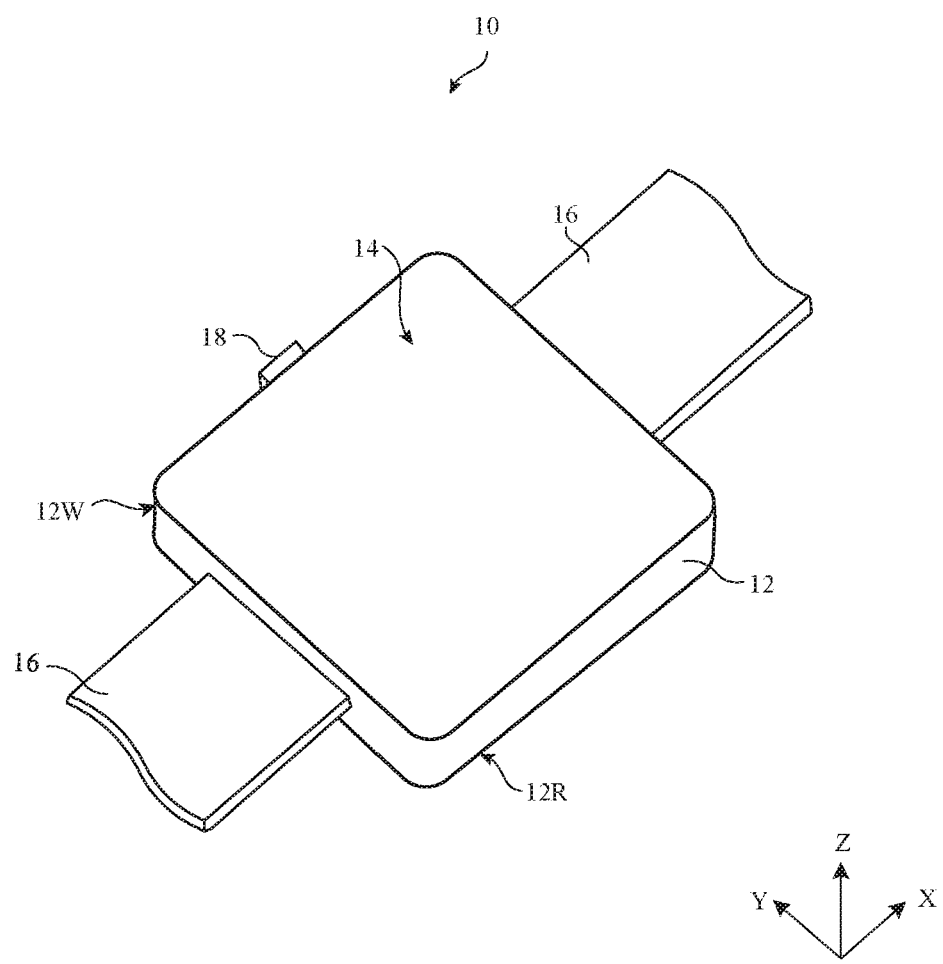
FIG. 1 is a perspective view of an illustrative electronic device with wireless circuitry in accordance with some embodiments.

Electronic devices such as electronic device 10 of FIG. 1 may be provided with wireless circuitry (sometimes referred to herein as wireless communications circuitry). The wireless circuitry may be used to support wireless communications in multiple wireless communications bands. Communications bands (sometimes referred to herein as frequency bands) handled by the wireless circuitry can include satellite navigation system communications bands, cellular telephone communications bands, wireless local area network communications bands, wireless personal area network communications bands, near-field communications bands, ultra-wideband communications bands, millimeter wave communications bands, or other wireless communications bands.

The wireless circuitry may include one or more antennas. The antennas of the wireless circuitry can include loop antennas, inverted-F antennas, strip antennas, planar inverted-F antennas, patch antennas, slot antennas, monopole antennas, dipole antennas, hybrid antennas that include antenna structures of more than one type, or other suitable antennas.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a wristwatch (e.g., a smart watch). Other configurations may be used for device 10 if desired. The example of FIG. 1 is merely illustrative.

In the example of FIG. 1, device 10 includes a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls such as sidewalls 12W or sidewalls formed from other materials. Examples of metal materials that may be used for forming sidewalls 12W include stainless steel, aluminum, silver, gold, metal alloys, or any other desired conductive material. Sidewalls 12W may sometimes be referred to herein as housing sidewalls 12W or conductive housing sidewalls 12W.

Display 14 may be formed at (e.g., mounted on) the front side (face) of device 10. Housing 12 may have a rear housing wall on the rear side (face) of device 10 such as rear housing wall 12R that opposes the front face of device 10. Conductive housing sidewalls 12W may surround the periphery of device 10 (e.g., conductive housing sidewalls 12W may extend around peripheral edges of device 10). Rear housing wall 12R may be formed from conductive materials and/or dielectric materials. Examples of dielectric materials that may be used for forming rear housing wall 12R include plastic, glass, sapphire, ceramic, wood, polymer, combinations of these materials, or any other desired dielectrics.

Rear housing wall 12R and/or display 14 may extend across some or all of the length (e.g., parallel to the X-axis of FIG. 1) and width (e.g., parallel to the Y-axis) of device 10. Conductive housing sidewalls 12W may extend across some or all of the height of device 10 (e.g., parallel to the Z-axis of FIG. 1). Conductive housing sidewalls 12W and/or rear housing wall 12R may form one or more exterior surfaces of device 10 (e.g., surfaces that are visible to a user of device 10) and/or may be implemented using internal structures that do not form exterior surfaces of device 10 (e.g., conductive or dielectric housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide housing walls 12R and/or 12W from view of the user).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. Display 14 may also be force sensitive and may gather force input data associated with how strongly a user or object is pressing against display 14.

Display 14 may include an array of display pixels formed from liquid crystal display (LCD) components, an array of electrophoretic display pixels, an array of plasma display pixels, an array of organic light-emitting diode (OLED) display pixels, an array of electrowetting display pixels, or display pixels based on other display technologies. Display 14 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10, for example.

Device 10 may include buttons such as button 18. There may be any suitable number of buttons in device 10 (e.g., a single button, more than one button, two or more buttons, five or more buttons, etc.). Buttons may be located in openings in housing 12 (e.g., openings in conductive housing sidewall 12W or rear housing wall 12R) or in an opening in display 14 (as examples). Buttons may be rotary buttons, sliding buttons, buttons that are actuated by pressing on a movable button member, etc. Button members for buttons such as button 18 may be formed from metal, glass, plastic, or other materials. Button 18 may sometimes be referred to as a crown in scenarios where device 10 is a wristwatch device.

Device 10 may, if desired, be coupled to a strap such as strap 16. Strap 16 may be used to hold device 10 against a user's wrist (as an example). Strap 16 may sometimes be referred to herein as wrist strap 16. In the example of FIG. 1, wrist strap 16 is connected to opposing sides of device 10. Conductive housing sidewalls 12W may include attachment structures for securing wrist strap 16 to housing 12 (e.g., lugs or other attachment mechanisms that configure housing 12 to receive wrist strap 16). Configurations that do not include straps may also be used for device 10.

Figure 2:
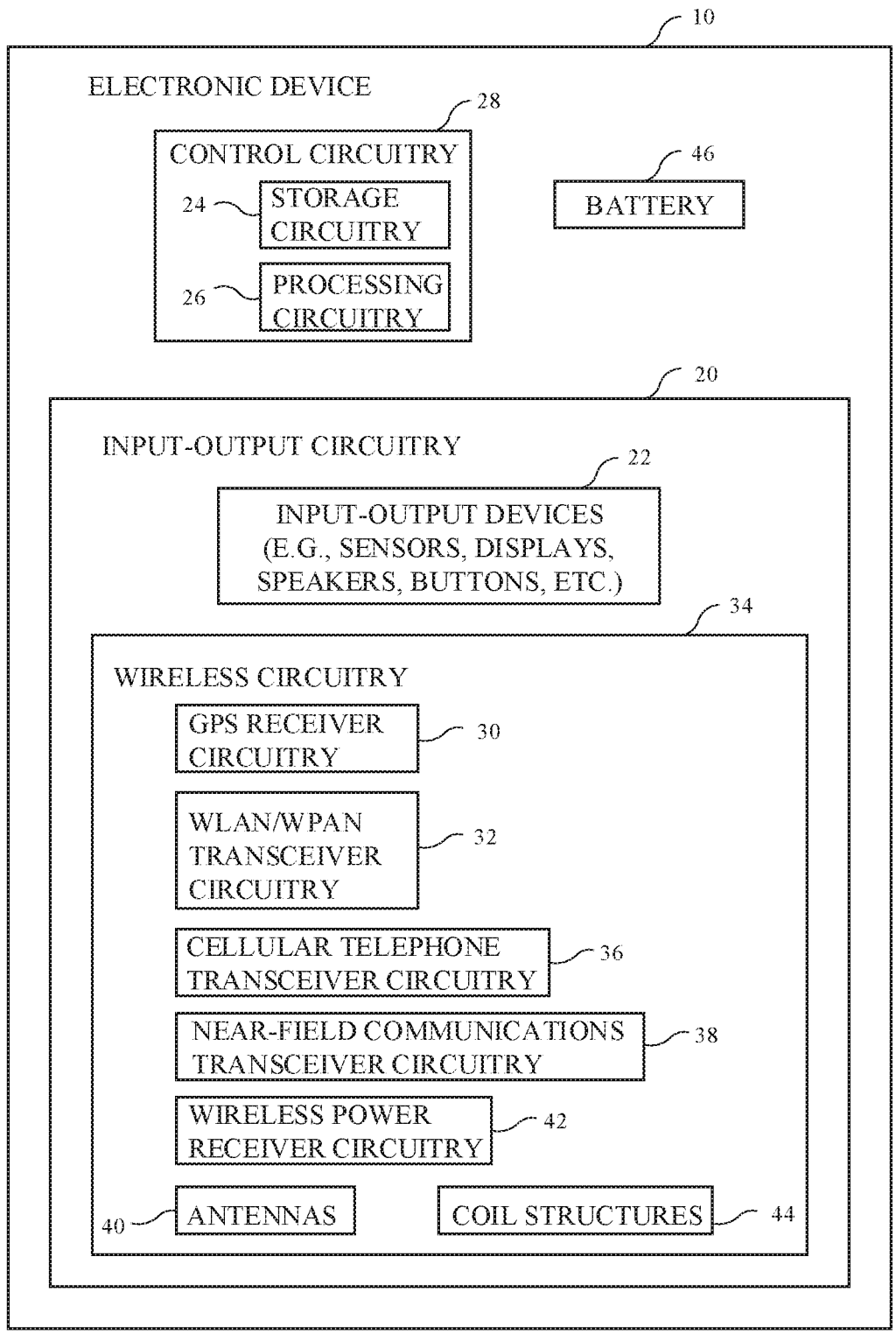
FIG. 2 is a schematic diagram of an illustrative electronic device with wireless circuitry in accordance with some embodiments.

A schematic diagram showing illustrative components that may be used in device 10 is shown in FIG. 2. As shown in FIG. 2, device 10 may include control circuitry 28. Control circuitry 28 may include storage such as storage circuitry 24. Storage circuitry 24 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 26. Processing circuitry 26 may be used to control the operation of device 10. Processing circuitry 26 may include on one or more microprocessors, microcontrollers, digital signal processors, host processors, baseband processor integrated circuits, application specific integrated circuits, central processing units (CPUs), etc. Control circuitry 28 may be configured to perform operations in device 10 using hardware (e.g., dedicated hardware or circuitry), firmware, and/or software. Software code for performing operations in device 10 may be stored on storage circuitry 24 (e.g., storage circuitry 24 may include non-transitory (tangible) computer readable storage media that stores the software code). The software code may sometimes be referred to as program instructions, software, data, instructions, or code. Software code stored on storage circuitry 24 may be executed by processing circuitry 26.

Control circuitry 28 may be used to run software on device 10 such as external node location applications, satellite navigation applications, internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols, cellular telephone protocols, MIMO protocols, antenna diversity protocols, satellite navigation system protocols (e.g., global positioning system (GPS) protocols, global navigation satellite system (GLONASS) protocols, etc.), IEEE 802.15.4 ultra-wideband communications protocols or other ultra-wideband communications protocols, data transfer protocols, etc. Each communications protocol may be associated with a corresponding radio access technology (RAT) that specifies the physical connection methodology used in implementing the protocol.

Data transfer protocols handled by control circuitry 28 (sometimes referred to herein as data bus protocols) may be used to perform high data rate data transfer operations (e.g., data transfer operations at speeds of 100 Megabits per second (Mbps) or more, at 500 Mbps or more, 1 bit per second or more, etc.). Data transfer protocols that may be implemented by control circuitry 28 may include Universal Serial Bus (USB) protocols, universal asynchronous receiver/transmitter (UART) protocols, Peripheral Component Interconnect (PCI) protocols, Peripheral Component Interconnect Express (PCIe) protocols, Accelerated Graphics Port (AGP) protocols, or any other desired data transfer protocols capable of data speeds (i.e., data rates) of greater than or equal to approximately 100 Mbps.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices (e.g., test port devices), and other input-output components. For example, input-output devices 22 may include touch screens, displays without touch sensor capabilities, buttons, scrolling wheels, touch pads, key pads, keyboards, microphones, cameras, buttons, speakers, status indicators, light sources, audio jacks and other audio port components, vibrators or other haptic feedback engines, digital data port devices, light sensors (e.g., infrared light sensors, visible light sensors, etc.), light-emitting diodes, motion sensors (accelerometers), capacitance sensors, proximity sensors, magnetic sensors, force sensors (e.g., force sensors coupled to a display to detect pressure applied to the display), etc.

Input-output circuitry 22 may include wireless circuitry 34. Wireless circuitry 34 may include wireless power receiving coil structures such as coil structures 44 and wireless power receiver circuitry such as wireless power receiver circuitry 42. Device 10 may use wireless power receiver circuitry 42 and coil structures 44 to receive wirelessly transmitted power (e.g., wireless charging signals) from a wireless power adapter (e.g., a wireless power transmitting device such as a wireless charging mat or other device). Coil structures 44 may include one or more inductive coils that use resonant inductive coupling (near field electromagnetic coupling) with a wireless power transmitting coil on the wireless power adapter.

The wireless power adapter may pass AC currents through the wireless power transmitting coil to produce a time varying electromagnetic (e.g., magnetic) field that is received as wireless power (wireless charging signals) by coil structures 44 in device 10. An illustrative frequency for the wireless charging signals is 200 kHz. Other frequencies may be used, if desired (e.g., frequencies in the kHz range, the MHz range, or in the GHz range, frequencies of 1 kHz to 1 MHz, frequencies of 1 kHz to 100 MHz, frequencies less than 100 MHz, frequencies less than 1 MHz, etc.). When the time varying electromagnetic field is received by coil structures 44, corresponding alternating-current (AC) currents are induced in the coil structures. Wireless power receiver circuitry 42 may include converter circuitry such as rectifier circuitry. The rectifier circuitry may include rectifying components such as synchronous rectification metal-oxide-semiconductor transistors arranged in a bridge network, and may convert these currents from coil structures 44 into a DC voltage for powering device 10. The DC voltage produced by the rectifier circuitry in wireless power receiver circuitry 42 can be used in powering (charging) an energy storage device such as battery 46 and can be used in powering other components in device 10.

To support wireless communications, wireless circuitry 34 may include radio-frequency (RF) transceiver circuitry formed from one or more integrated circuits, power amplifier circuitry, low-noise input amplifiers, passive RF components, one or more antennas such as antenna(s) 40, transmission lines, and other circuitry for handling RF wireless signals. Wireless signals can also be sent using light (e.g., using infrared communications).

Wireless circuitry 34 may include radio-frequency transceiver circuitry for handling various radio-frequency communications bands. For example, wireless circuitry 34 may include wireless local area network (WLAN) and wireless personal area network (WPAN) transceiver circuitry 32. Transceiver circuitry 32 may handle 2.4 GHz and 5 GHz bands for WiFi® (IEEE 802.11) communications or other WLAN bands and may handle the 2.4 GHz Bluetooth® communications band or other WPAN bands. Transceiver circuitry 32 may sometimes be referred to herein as WLAN/WPAN transceiver circuitry 32.

Wireless circuitry 34 may use cellular telephone transceiver circuitry 36 for handling wireless communications in frequency ranges (communications bands) such as a cellular low band (LB) from 600 to 960 MHz, a cellular low-midband (LMB) from 1410 to 1510 MHz, a cellular midband (MB) from 1710 to 2170 MHz, a cellular high band (HB) from 2300 to 2700 MHz, a cellular ultra-high band (UHB) from 3300 to 5000 MHz, or other communications bands between 600 MHz and 5000 MHz or other suitable frequencies (as examples). Cellular telephone transceiver circuitry 36 may handle voice data and non-voice data.

Wireless circuitry 34 may include satellite navigation system circuitry such as Global Positioning System (GPS) receiver circuitry 30 for receiving GPS signals at 1575 MHz or for handling other satellite positioning data (e.g., GLONASS signals at 1609 MHz). Satellite navigation system signals for receiver circuitry 30 are received from a constellation of satellites orbiting the earth. Wireless circuitry 34 can include circuitry for other short-range and long-range wireless links if desired. For example, wireless circuitry 34 may include circuitry for receiving television and radio signals, paging system transceivers, near field communications (NFC) transceiver circuitry 38 (e.g., an NFC transceiver operating at 13.56 MHz or another suitable frequency), etc.

In some configurations that are sometimes described herein as an example, near-field communications circuitry 38 may include transceiver circuitry operable at frequencies above about 10 GHz (e.g., at frequencies between about 10 GHz and 300 GHz), and may therefore are sometimes be referred to herein as millimeter/centimeter wave transceiver circuitry. For example, the millimeter/centimeter wave transceiver circuitry may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As an example, near-field communications circuitry 38 may include millimeter/centimeter wave transceiver circuitry operable at about 60 GHz (or any frequency in a millimeter/centimeter wave frequency band) to establish a wireless link useable for data transfer (e.g., between device 10 as a wristwatch and a computer, between device 10 as a wristwatch and another electronic device, between device 10 as a first electronic device and a second electronic device, etc.). If desired, near-field communications circuitry 38 include radio-frequency transceiver circuitry operable at a frequency lower than 10 GHz to establish a wireless link usable for data transfer. In some configurations, non-near-field communications circuitry may be used to support communications in Extremely High Frequency (EHF) or millimeter wave communications bands between about 30 GHz and 300 GHz and/or in centimeter wave communications bands between about 10 GHz and 30 GHz. Wireless data transfer protocols may be used by transceiver circuitry 38 to bidirectionally transfer data at these frequencies.

In NFC links, wireless signals are typically conveyed over a few inches at most (e.g., less than five inches, less than four inches, less than three inches, etc.). In satellite navigation system links, cellular telephone links, and other long-range links, wireless signals are typically used to convey data over thousands of feet or miles. In WLAN and WPAN links at 2.4 and 5 GHz and other short-range wireless links, wireless signals are typically used to convey data over tens or hundreds of feet. Antenna diversity schemes may be used if desired to ensure that the antennas that have become blocked or that are otherwise degraded due to the operating environment of device 10 can be switched out of use and higher-performing antennas used in their place.

Wireless circuitry 34 may include antennas 40. Antennas 40 may be formed using any suitable antenna types. For example, antennas 40 may include antennas with resonating elements that are formed from slot antenna structures, loop antenna structures, patch antenna structures, stacked patch antenna structures, antenna structures having parasitic elements, inverted-F antenna structures, planar inverted-F antenna structures, helical antenna structures, monopole antennas, dipole antenna structures, Yagi (Yagi-Uda) antenna structures, surface integrated waveguide structures, hybrids of these designs, etc. If desired, one or more of antennas 40 may be cavity-backed antennas.

Different types of antennas may be used for different bands and combinations of bands. For example, one type of antenna may be used in forming a local wireless link antenna whereas another type of antenna is used in forming a remote wireless link antenna. If desired, space may be conserved within device 10 by using a single antenna to handle two or more different communications bands. For example, a single antenna 40 in device 10 may be used to handle communications in a WiFi® or Bluetooth® communication band at 2.4 GHz, a GPS communications band at 1575 MHz, a WiFi® or Bluetooth® communications band at 5.0 GHz, and one or more cellular telephone communications bands such as a cellular low band between about 600 MHz and 960 MHz and/or a cellular midband between about 1700 MHz and 2200 MHz. If desired, a combination of antennas for covering multiple frequency bands and dedicated antennas for covering a single frequency band may be used.

It may be desirable to implement at least some of the antennas in device 10 using portions of electrical components that would otherwise not be used as antennas and that support additional device functions. As an example, it may be desirable to induce antenna currents in components such as display 14 (FIG. 1), so that display 14 and/or other electrical components (e.g., a touch sensor, near-field communications loop antenna, conductive display assembly or housing, conductive shielding structures, etc.) can serve as part of an antenna for Wi-Fi, Bluetooth, GPS, cellular frequencies, and/or other frequencies without the need to incorporate separate bulky antenna structures in device 10. Conductive portions of housing 12 (FIG. 1) may be used to form part of an antenna ground for one or more antennas 40.

Figure 3:
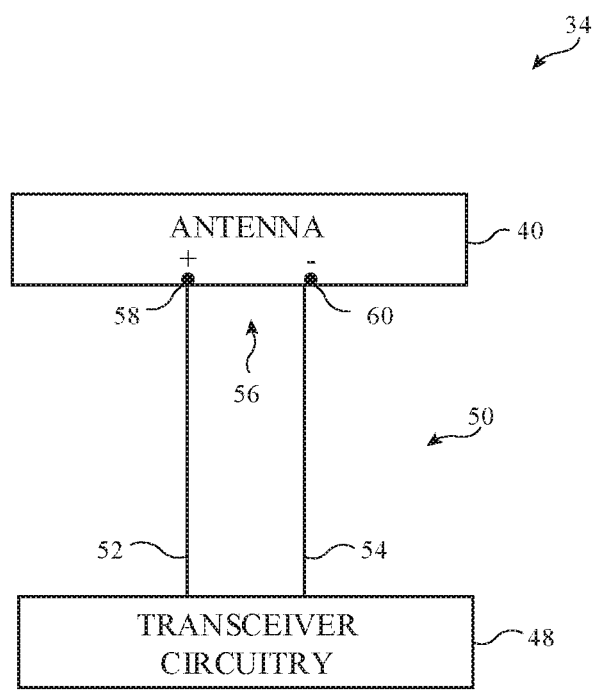
FIG. 3 is a diagram of illustrative wireless circuitry in an electronic device in accordance with some embodiments.

A schematic diagram of wireless circuitry 34 is shown in FIG. 3. As shown in FIG. 3, wireless circuitry 34 may include transceiver circuitry 48 (e.g., cellular telephone transceiver circuitry 36 of FIG. 2, WLAN/WPAN transceiver circuitry 32, etc.) that is coupled to a given antenna 40 using a radio-frequency transmission line path such as radio-frequency transmission line path 50.

To provide antenna structures such as antenna 40 with the ability to cover different frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components that tune the antenna over communications (frequency) bands of interest. The tunable components may be part of a tunable filter or tunable impedance matching network, may be part of an antenna resonating element, may span a gap between an antenna resonating element and antenna ground, etc.

Radio-frequency transmission line path 50 may include one or more radio-frequency transmission lines (sometimes referred to herein simply as transmission lines). Radio-frequency transmission line path 50 (e.g., the transmission lines in radio-frequency transmission line path 50) may include a positive signal conductor such as signal conductor 52 and a ground signal conductor such as ground conductor 54.

The transmission lines in radio-frequency transmission line path 50 may, for example, include coaxial cable transmission lines (e.g., ground conductor 54 may be implemented as a grounded conductive braid surrounding signal conductor 52 along its length), stripline transmission lines (e.g., where ground conductor 54 extends along two sides of signal conductor 52), a microstrip transmission line (e.g., where ground conductor 54 extends along one side of signal conductor 52), coaxial probes realized by a metalized via, edge-coupled microstrip transmission lines, edge-coupled stripline transmission lines, waveguide structures (e.g., coplanar waveguides or grounded coplanar waveguides), combinations of these types of transmission lines and/or other transmission line structures, etc.

Transmission lines in radio-frequency transmission line path 50 may be integrated into rigid and/or flexible printed circuit boards. In one suitable arrangement, radio-frequency transmission line path 50 may include transmission line conductors (e.g., signal conductors 52 and ground conductors 54) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network may include components such as inductors, resistors, and capacitors used in matching the impedance of antenna 40 to the impedance of radio-frequency transmission line path 50. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Radio-frequency transmission line path 50 may be coupled to antenna feed structures associated with antenna 40. As an example, antenna 40 may form an inverted-F antenna, a planar inverted-F antenna, a patch antenna, a loop antenna, or other antenna having an antenna feed 56 with a positive antenna feed terminal such as terminal 58 and a ground antenna feed terminal such as terminal 60. Positive antenna feed terminal 58 may be coupled to an antenna resonating (radiating) element within antenna 40. Ground antenna feed terminal 60 may be coupled to an antenna ground in antenna 40. Signal conductor 52 may be coupled to positive antenna feed terminal 58 and ground conductor 54 may be coupled to ground antenna feed terminal 60.

Other types of antenna feed arrangements may be used if desired. For example, antenna 40 may be fed using multiple feeds each coupled to a respective port of transceiver circuitry 48 over a corresponding transmission line. If desired, signal conductor 52 may be coupled to multiple locations on antenna 40 (e.g., antenna 40 may include multiple positive antenna feed terminals coupled to signal conductor 52 of the same radio-frequency transmission line path 50). Switches may be interposed on the signal conductor between transceiver circuitry 48 and the positive antenna feed terminals if desired (e.g., to selectively activate one or more positive antenna feed terminals at any given time). The illustrative feeding configuration of FIG. 3 is merely illustrative.

Device 10 may include multiple antennas that convey radio-frequency signals through different sides of device 10. For example, device 10 may include at least first antenna that conveys radio-frequency signals through the front face of device 10 (e.g., display 14 of FIG. 1) and a second antenna that conveys radio-frequency signals through the rear face of device 10 (e.g., rear housing wall 12R of FIG. 1).

Figure 4:
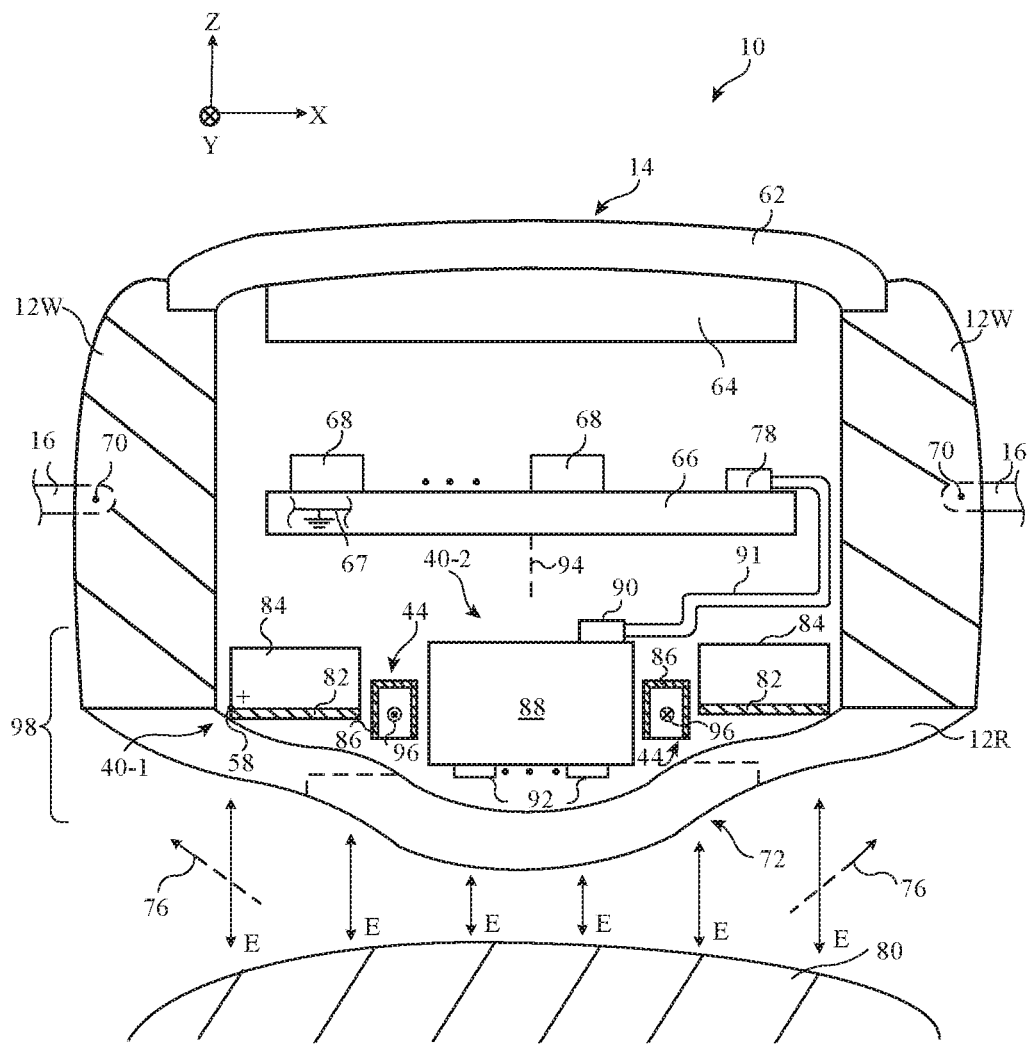
FIG. 4 is a cross-sectional side view of an illustrative electronic device having antenna elements and sensor circuitry overlapping a rear housing wall in accordance with some embodiments.

FIG. 4 is a cross-sectional side view of electronic device 10 showing how a given (first) antenna 40-1 may be mounted within device 10 for conveying (radiating) radio-frequency signals through rear housing wall 12R. As shown in FIG. 4, display 14 may form the front face of device 10 whereas rear housing wall 12R forms the rear face of device 10. In the example of FIG. 4, rear housing wall 12R is formed from a dielectric material such as glass, sapphire, ceramic, or plastic. This is merely illustrative and, if desired, rear housing wall 12R may also include conductive portions (e.g., a conductive frame surrounding one or more dielectric windows in rear housing wall 12R, conductive cosmetic layers, etc.). Conductive housing sidewalls 12W may extend from the rear face to the front face of device 10 (e.g., from rear housing wall 12R to display 14).

Strap 16 may be secured to conductive housing sidewalls 12W using corresponding attachment structures 70. Attachment structures 70 may include lugs, spring structures, clasp structures, adhesive structures, or any other desired attachment mechanisms. Strap 16 may be formed using any desired materials (e.g., metal materials, dielectric materials, or combinations of metal and dielectric materials). If desired, strap 16 may be removed from attachment structures 70 (e.g., so that a user of device 10 can swap in different straps having similar or different materials).

Display 14 may include a display module 64 (sometimes referred to herein as display stack 64, display assembly 64, or active area 64 of display 14) and a display cover layer 62. Display module 64 may, for example, form an active area or portion of display 14 that displays images and/or receives touch sensor input. The lateral portion of display 14 that does not include display module 64 (e.g., portions of display 14 formed from display cover layer 62 but without an underlying portion of display module 64) may sometimes be referred to herein as the inactive area or portion of display 14 because this portion of display 14 does not display images or gather touch sensor input.

Display module 64 may include conductive components (sometimes referred to herein as conductive display structures) that are used in forming portions of an antenna that radiates through the front face of device 10 (e.g., an antenna having a radiating element such as a radiating slot element defined by display module 64 and/or conductive housing sidewalls 12W). The conductive display structures in display module 64 may, for example, have planar shapes (e.g., planar rectangular shapes, planar circular shapes, etc.) and may be formed from metal and/or other conductive material that carries antenna currents for a front-facing antenna in device 10. The conductive display structures may include a frame for display module 64, pixel circuitry, touch sensor electrodes, an embedded near-field communications antenna, etc.

Display cover layer 62 may be formed from an optically transparent dielectric such as glass, sapphire, ceramic, or plastic. Display module 64 may display images (e.g., emit image light) through display cover layer 62 for view by a user and/or may gather touch or force sensor inputs through display cover layer 62. If desired, portions of display cover layer 62 may be provided with opaque masking layers (e.g., ink masking layers) and/or pigment to obscure the interior of device 10 from view of a user.

Substrates such as substrate 66 (e.g., a rigid or flexible printed circuit board, integrated circuit or chip, integrated circuit package, etc.) may be located within the interior of device 10. Substrate 66 may be, for example, a main logic board (MLB) or other logic board for device 10. Other components such as components 68 (e.g., components used in forming control circuitry 28 and/or input-output circuitry 20 of FIG. 2, battery 46, etc.) may be mounted to substrate 66 and/or elsewhere within the interior of device 10.

As shown in FIG. 4, a given (first) antenna 40-1 may be mounted within device 10 for radiating through rear housing wall 12R. Ground traces 67 may be formed on substrate 66 and may form part of the antenna ground for antenna 40-1. Conductive housing sidewalls 12W may also form part of the antenna ground for antenna 40-1 (e.g., ground traces 67 on substrate 66 may be electrically shorted to conductive housing sidewalls 12W). Conductive portions of other components in device 10 may also form part of the antenna ground for antenna 40-1 (e.g., ground traces 67 on substrate 66, conductive housing sidewalls 12W, and/or conductive portions of other components in device 10 may be held at a ground or reference potential).

Antenna 40-1 may include an antenna resonating element 82 formed from conductive traces on a substrate such as substrate 84. Substrate 84 may be a plastic substrate, a flexible printed circuit substrate, a rigid printed circuit substrate, a ceramic substrate, or any other desired dielectric substrate. The conductive traces in antenna resonating element 82 (sometimes referred to herein as antenna radiating element 82, resonating element 82, radiating element 82, or antenna element 82) may, for example, be patterned onto substrate 84 using a laser direct structuring (LDS) process. In another suitable arrangement, antenna resonating element 82 may be formed from metal foil, layers of sheet metal, conductive portions of the housing for device 10, etc.

Antenna resonating element 82 may be a patch antenna resonating element, an inverted-F antenna resonating element, a planar inverted-F antenna resonating element, a monopole resonating element, a dipole resonating element, a loop resonating element, another type of antenna resonating element, and/or a combination of these types of antenna resonating elements. If desired, antenna resonating element 82 and/or substrate 84 may laterally extend circumferentially around central axis 94 (e.g., antenna resonating element 82 may lie within a given plane or surface and may have a loop shape that extends around an opening, where central axis 94 runs orthogonally through the opening). Positive antenna feed terminal 58 for antenna 40-1 may be coupled to antenna resonating element 82. The ground antenna feed terminal for antenna 40-1 (not shown in FIG. 4 for the sake of clarity) may be coupled to conductive housing sidewalls 12W, ground traces 67 on substrate 66, or any other desired portion of the antenna ground for antenna 40-1.

Rear housing wall 12R may extend across substantially all of the length and width of device 10 (e.g., in the X-Y plane). Rear housing wall 12R may be optically opaque or optically transparent or may include both optically opaque and optically transparent portions (e.g., rear housing wall 12R may include optically transparent windows in an otherwise optically opaque member). Antenna resonating element 82 may overlap rear housing wall 12R and may, if desired, be spaced apart from rear housing wall 12R, pressed against rear housing wall 12R, adhered to rear housing wall 12R, etc. In this way, antenna 40-1 may be formed at or adjacent to the rear face of device 10 for radiating through rear housing wall 12R. If desired, antenna resonating element 82 may conform to the shape of the interior surface of rear housing wall 12R (e.g., antenna resonating element 82 need not be planar). In the example of FIG. 4, the interior surface of rear housing wall 12R has a slightly curved or concave shape (e.g., to form a protruding portion 72 that increases the total volume for components within device 10 relative to scenarios where the interior surface of rear housing wall 12R is flat).

Antenna 40-1 may transmit and receive radio-frequency signals (e.g., in at least the cellular low band, the cellular low-midband, the cellular midband, and/or the cellular high band) through rear housing wall 12R. The radio-frequency signals transmitted by antenna 40-1 may be shielded from electrical components 68 and the antenna at the front face of device 10 by ground traces 67 on substrate 66, for example. Similarly, ground traces 67 and substrate 66 may shield antenna 40-1 from components 68 and the antenna at the front face of device 10, thereby maximizing isolation between the antennas in device 10 despite the relatively small size of device 10.

By forming antenna 40-1 at rear housing wall 12R, the vertical height of device 10 (e.g., parallel to the Z-axis of FIG. 4) may be shorter than would otherwise be possible in scenarios where the corresponding antenna resonating element is located elsewhere on device 10 (while still allowing antenna 40-1 to exhibit satisfactory antenna efficiency). As an example, the vertical height of device 10 may be less than or equal to 11.4 mm, less than 15 mm, between 8 and 11.4 mm, or any other desired height while still allowing antenna 40-1 to operate with satisfactory antenna efficiency.

In practice, the wireless performance of antenna 40-1 may be optimized by the presence of an external object adjacent to rear housing wall 12R. For example, the presence of the user's wrist 80 adjacent to rear housing wall 12R when the user is wearing device 10 may enhance the wireless performance of antenna 40-1. During operation, antenna 40-1 may transmit and/or receive radio-frequency signals having electric fields (E) that are oriented normal to the surfaces of rear housing wall 12R and wrist 80. These signals may sometimes be referred to as surface waves, which are then propagated along the surface of wrist 80 and outwards, as shown by paths 76 (e.g., antenna resonating element 82 and wrist 80 may serve as a waveguide that directs the surface waves outwards). This may allow the radio-frequency signals conveyed by antenna 40-1 to be properly received by external communications equipment (e.g., a wireless base station) even though antenna 40-1 is located close to wrist 80 and typically pointed away from the external communications equipment.

Coil structures 44 may also be mounted within device 10 at or adjacent to rear housing wall 12R. Coil structures 44 may be spaced apart from rear housing wall 12R, pressed against rear housing wall 12R, adhered to rear housing wall 12R, etc. As shown in FIG. 4, antenna 40-1 (e.g., antenna resonating element 82) may laterally extend around (surround) coil structures 44 (e.g., coil structures 44 may lie within an opening in antenna resonating element 82). Coil structures 44 may also circumferentially surround central axis 94 (e.g., coil structures 44 may laterally extend around central axis 94 within the X-Y plane or another surface). In this way, coil structures 44 and antenna 40-1 may extend concentrically around central axis 94. Coil structures 44 may laterally surround module 88 and/or an opening that overlaps module 88.

Coil structures 44 may receive wireless charging signals through rear housing wall 12R (e.g., when device 10 is placed on a wireless power adapter or other wireless power transmitting device). The wireless charging signals may induce currents on coil structures 44 that are used by wireless power receiver circuitry 42 for charging battery 46 (FIG. 2). Coil structures 44 may include a single conductive coil (e.g., an inductive coil) or more than one conductive coil. In one suitable arrangement, coil structures 44 may include a first coil with windings that coil (wind) around central axis 94 and a second coil with windings that extend perpendicular to the windings in the first coil. The second coil may, for example, include windings that coil (wind) around axis 96 (e.g., a ring-shaped axis that loops around central axis 94 and lies within the X-Y plane). The windings in the first and second coils may include conductive wire (e.g., copper wire), conductive traces, or any other desired conductive material.

Coil structures 44 may include ferrite structures such as ferrite structures 86. Ferrite structures 86 may include ferrite shield structures that help to electromagnetically shield coil structures 44 from other components in device 10. If desired, ferrite structures 96 may be omitted for one or more portions of coil structures 44. If desired, ferrite structures 86 may additionally or alternatively include one or more ferrite cores for the windings in coil structures 44 (e.g., the windings in coil structures 44 may be wound around the ferrite core(s)). Ferrite cores in coil structures 44 may help to maximize the wireless charging efficiency for device 10.

Device 10 may include module 88 (sometimes referred to as backside circuitry module 88 or backside control module 88) that is mounted on or adjacent to rear housing wall 12R. Backside circuitry module 88 may include sensor circuitry and may therefore sometimes be referred to herein as sensor module 88. Central axis 94 may extend (e.g., orthogonally) through a lateral surface of sensor module 88. Sensor module 88 may be separated from rear housing wall 12R, pressed against rear housing wall 12R, adhered to rear housing wall 12R, etc. Sensor module 88 may overlap protruding portion 72 of rear housing wall 12R and may be partially or completely located within protruding portion 72 (e.g., defined between the portions of rear housing wall 12R between dashed lines in FIG. 4). Sensor module 88 may include a rigid printed circuit board, flexible printed circuit, integrated circuit chip, integrated circuit package, plastic substrate, or other substrates for supporting one or more sensors 92 (e.g., one or more sensors 92 may be mounted to a sensor board or a support structure). Sensors 92 may, for example, include sensors in input-output devices 22 of FIG. 2.

If desired, sensor electrodes may be formed, within, at, or on rear housing wall 12R (e.g., the sensor electrodes may be at least partially embedded within the dielectric material of rear housing wall 12R). In this example, the sensor electrodes may be coupled to sensor circuitry in sensor module 88 using one or more conductive paths (not shown in FIG. 4 for the sake of clarity). The sensor electrodes may, for example, be electrocardiogram (ECG or EKG) electrodes. Sensor circuitry in sensor module 88 may sense the electrical activity of a user's heart using the sensor electrodes formed within, at, or on rear housing wall 12R while the user wears device 10, for example. In another suitable arrangement, the sensor electrodes may be mounted within sensor module 88.

Sensor module 88 may include ground traces (e.g., ground traces in a printed circuit board for sensor circuitry) that are held at a ground or reference potential. If desired, the ground traces in sensor module 88 may be shorted to conductive housing sidewalls 12W, ground traces 67, or other ground structures in device 10. Printed circuit 91 such as a flexible printed circuit may connect to substrate 66 (using connector 78) and may connect to sensor module 88 (using connector 90). As an example, sensor module 88 may convey sensor signals or other signals to components on substrate 66 (e.g., components 68 such as control circuitry 28 in FIG. 2) via printed circuit 91 and may receive control signals or other signals from the components on substrate 66. If desired, circuitry other than sensor circuitry in backside circuitry module 88 may also convey and receive data signals or other signals to and from the components on substrate 66.

In general, it may be desirable to remove wired connections or links from device 10 (e.g., connector components in device 10) to provide a seamless exterior device surface, to improve device waterproofing, and to optimize useable device interior space by removing bulky connector components, etc. As an example, ports and connectors for receiving wired connections (e.g., configured to convey debug data for debugging various functionalities of device 10, test data for testing various functionalities of device 10, and/or other data) may be located at sidewalls 12W such as at a location near or at where attachment structure 70 is disposed. It may be desirable to remove these ports and connectors for wired connections.

It may similar be desirable to migrate from wired connections (e.g., implemented using connector components) to wireless connections or links (e.g., implemented using wireless circuitry 34 in FIG. 2) to maintain and/or improve existing applications of the wired connections. In the above example, it may be desirable to not only remove the ports and connectors for wired connections, but also replace them with wireless connections for conveying debug, test, and/or other data. To maintain and/or improve existing applications of wired connection with wireless connections, the wireless connections may transmit and/or receive data using high data rates in a bidirectional data link (or unidirectional data link) in the near-field domain (e.g., across a distance of less than five inches, less than four inches, less than three inches, etc., rather than in a far-field domain across a distance of greater than five inches, greater than four inches, etc.). As examples, the wireless connections may transmit and receive data using high data rate data transfer operations at speeds of 100 Kilobit per second or more, 1 Megabit per second (Mbps) or more, 100 Mbps or more, at 500 Mbps or more, 1 Gigabit bit per second or more, etc. to satisfactorily replace some wired connections (e.g., wired connection for conveying debug, test, and/or other data).

The examples of removing and/or replacing ports and connectors at sidewalls 12W and replacing wired connections for conveying debug and/or test data are merely illustrative. If desired, it may be similarly desirable to remove and/or replace other wired connections such as USB wired connections or wired connections based on other protocols, or wired connections for conveying other types of signals with wireless connections (e.g., high data rate, bidirectional, and/or near-field wireless connections).

Additionally, by providing these wireless connections, device 10 (as an example) may be more easily accessible (e.g., without physical attachment) than in scenarios where device 10 includes the wired counterparts that require physical attachment for access. As examples, by using these wireless connections, device 10 may be configured to receive software updates and debug and test data while still sealed inside a device package or with other member surrounding or enclosing the device, may be configured to transmit and receive debug and test data without concerns for wire misalignment with respect to the debug and test circuitry, etc.

Given the limited device interior space, incorporating additional wireless circuitry (e.g., antennas) to implement these wireless connections may require compact and well-integrated antenna element implementations.

Still referring to FIG. 4, additional wireless circuitry such as a second antenna 40-2, related components for antenna 40-2, and/or other antenna elements may be formed from and/or integrated with components within backside circuitry module 88. By integrating the additional wireless circuitry within backside circuitry module 88, device 10 may implement wireless connections in a compact and well-integrated manner. As an example, the additional wireless circuitry within backside circuitry module 88 may be configured to transmit and receive debug and/or test data using high data rate, bidirectional, and/or near-field wireless connections. This is merely illustrative. If desired, the additional wireless circuitry within backside circuitry module 88 (or implemented elsewhere) may be used to provide any suitable wireless connection or link that is useable to transmit and/or convey any suitable type of data.

Figure 5:
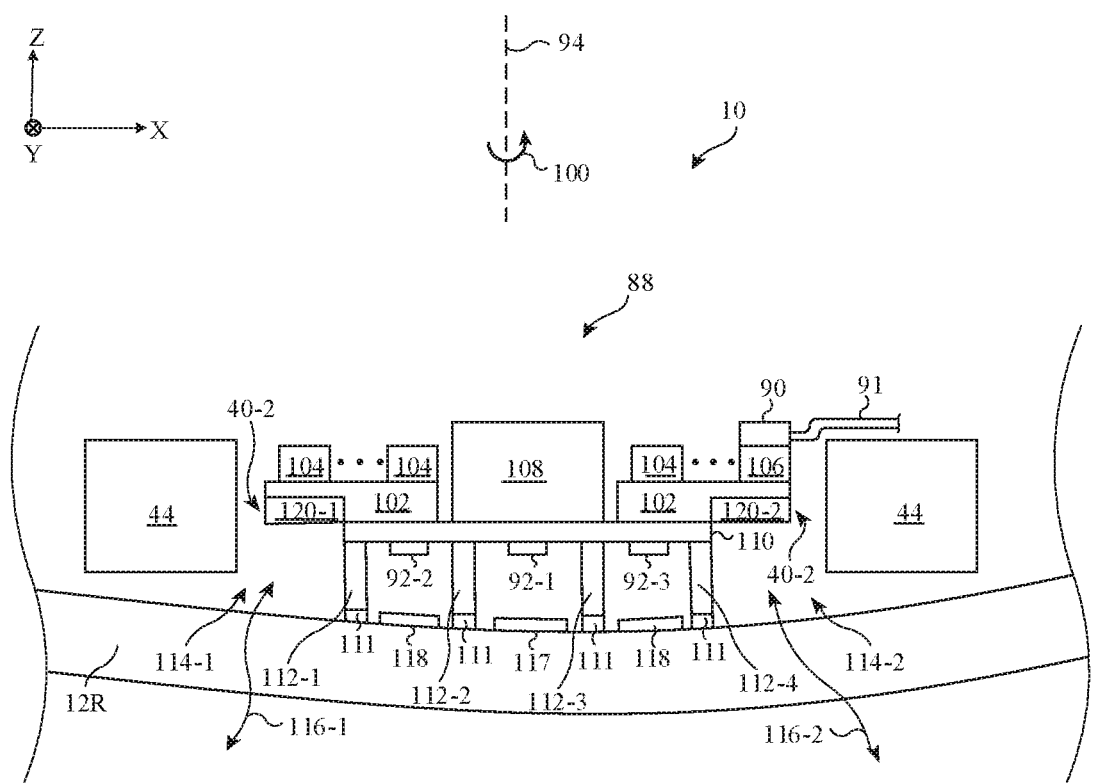
FIG. 5 is a cross-sectional side view of an illustrative electronic device having antenna elements embedded in a substrate and overlapping a rear housing wall in accordance with some embodiments.

FIG. 5 is a cross-sectional view of electronic device 10 showing how components in backside circuitry module 88 may be disposed within device 10 at rear housing wall 12R. In the example of FIG. 5, a given (second) antenna 40-2 may be integrated within backside circuitry module 88 to form an illustrative compact and well-integrated antenna implementation (as described in connection with FIG. 4) and may convey (radiate) radio-frequency signals through rear housing wall 12R.

Backside circuitry module 88 may include a substrate such as substrate 102 (e.g., a rigid or flexible printed circuit board, integrated circuit or chip, integrated circuit package, etc.). Substrate 102 may be a logic board for device 10 such as a sensor logic board. Substrate 102 may have components 104, which are mounted to a top surface of substrate 102. Components 104 may include active circuitry such as processing circuitry, sensor circuitry, radio-frequency transceiver circuitry, etc., passive circuitry such as resistors, capacitors, or other passive components, connector structures such as connector 106, or other components. Components 104 may be implemented as integrated circuit dies or chips, integrated circuit die packages, standalone components, surface mount components, etc.

Substrate 102 may include conductive traces formed at surfaces of substrate 102 such as top, bottom, and/or (peripheral and interior) side surfaces and/or conductive traces embedded within substrate 102. Conductive traces of substrate 102 may (electrically) connect some components on substrate 102 to other components on substrate 102, may connect components on substrate 102 to components not mounted on substrate 102 (e.g., components mounted on substrate 66, device housing 12, other components within backside circuitry module 88, etc.), or may serve any other suitable interconnect functions.

One or more components 104 mounted on substrate 102 may be electrically connected to connector 106 to send and/or receive control signals, data signals, etc. to and/or from circuitry external to backside circuitry module 88. Connector 106 on substrate 102 may mate with connector 90 on printed circuit 91. Printed circuit 91 may provide connections between substrate 102 and 66 (FIG. 4). Printed circuit 91 may therefore convey signals between components 104 on substrate 102 and components 68 on substrate 66. As an example, component 104 may include wireless circuitry such as radio-frequency transceiver circuitry 48 (FIG. 3). Printed circuit 91 may provide connections between radio-frequency transceiver circuitry 48 and a baseband processor on substrate 66. The baseband processor may convey and/or receive baseband signals from the wireless circuitry (e.g., radio-frequency transceiver circuitry) on substrate 66 within backside circuitry module 88 through printed circuit 91 (and through conductive traces on and/or in substrate 102).

Substrate 102 may also circumferentially surround central axis 94 (e.g., substrate 102 may laterally extend around central axis 94 within the X-Y plane or another surface). In this way, substrate 102 and coil structures 44 may extend concentrically around central axis 94. Substrate 102 may laterally surround sensor circuitry 108 (sometimes referred to herein as sensor components 108). In other words, substrate 102 may have or define a central opening, in which sensor circuitry 108 is disposed. Sensor circuitry 108 and substrate 102 may be mounted on support structures such as planar support structure 110 (e.g., axis 94 may be perpendicular to support structure 110).

Vertical support structures 112 (referring to support structures 112-1, 112-2, 112-3, and 112-4, collectively) may support planar support structure 110 and may extend parallel to axis 94. Vertical support structures 112 (sometimes referred to herein as support posts 112) may be attached to rear housing wall 12R via attachment structures such as (pressure-sensitive) adhesive 111. Support structures 110 and 112 may be formed from dielectric material, conductive material, ceramic material, any suitable material, or any suitable combination of materials. Adhesive 111 may be omitted if desired.

If desired, support structure 112-1 may be integral with support structure 112-4 (e.g., support structure 112-1 may be connected to support structure 112-4 to form a ring-shaped support structure that circumferentially surround central axis 94). The ring-shaped support structure formed from support structures 112-1 and 112-4 may laterally extend around central axis 94 within the X-Y plane or another surface. Similarly, support structure 112-2 may be integral with support structure 112-3 (e.g., support structure 112-2 may be connected to support structure 112-3 to form a ring-shaped structure that circumferentially surround central axis 94). The ring-shaped support structure formed from support structures 112-2 and 112-3 may laterally extend around central axis 94 within the X-Y plane or another surface. The ring-shaped support structure formed form support structures 112-1 and 112-4 may surround the ring-shaped support structure formed from support structures 112-2 and 112-3. If desired, one or more of vertical support structures 112 may be integral with planar support structure 110. If desired, one or more support structures 112 and/or support structures 110 may be omitted.

Support structures 110 and 112 may define chambers in which sensors 92 (referring to sensor 92-1, 92-2, and 92-3, collectively) are disposed. In particular, support structures 110 and 112 may isolate one sensor from another (e.g., sensor 92-1 from sensor 92-2, sensor 92-1 from sensor 92-3). Sensors 92 may also be mounted to support structure 110 (e.g., on an opposing surface from the surface on which substrate 102 and sensor circuitry 108 is mounted). If desired, support structure 110 may include and/or accommodate conductive lines, through which circuitry such as sensor circuitry 108 may be coupled to sensors 92 or through which any suitable interconnection may be provided between components mounted to support structure 110 (e.g., between components mounted on opposing sides of support structure 110).

Sensors 92 may include one or more sensors such as a light sensor, proximity sensor, touch sensor, or other sensors. As one example, sensor 92-1 may include at least one (infrared) light emitter, and sensors 92-2 and 92-3 may include at least one (infrared) light sensor (e.g., may each include a light sensor). Light emitter 92-1 may emit light through rear housing wall 12R (e.g., through an optically-transparent and/or infrared-transparent window in rear housing wall 12R). Light sensors 92-2 and 92-3 may receive a reflected version of the emitted light that has been reflected off of an external object in the vicinity of device 10 such as wrist 80 (FIG. 4) of a user (e.g., a user who is wearing device 10 on their wrist in scenarios where device 10 is a wristwatch).

In this example, lens structure 117 may be formed at or on rear housing wall 12R through which light emitted from light emitter 92-1 may travel. Lens structure 117 may be configured to focus the light emitted from light emitter 92-1. Filter structure 118 may be formed at or on rear housing wall 12R through which reflected light may travel to reach light sensors 92-2 and 92-3. Filter structure 118 may be used to pass only light received from selected angles to light sensors 92-2 and 92-3 to provide optical isolation and to prevent crosstalk from light directed emitted from light emitter 92-1. This example is merely illustrative and, if desired, one or more of sensors 92 may include any other desired components or may be omitted.

To form a compact and well-integrated antenna in backside circuitry module 88, wireless circuitry such as antenna structures may be formed within substrate 102. As shown in FIG. 5, antennas 40-2 may include antenna structures 120-1 formed in (e.g., embedded within) one lateral side of substrate 102 and antenna structures 120-2 formed in (e.g., embedded within) an opposing lateral side of substrate 102. Antenna structures 120 (referring to antenna structures 120-1 and/or 120-2) embedded within substrate 102 may include antenna resonating elements, parasitic antenna elements, antenna ground structures, antenna feed terminals, antenna short circuit paths, radio-frequency transmission line structures, antenna tuning components, and/or any other suitable antenna elements.

Antenna resonating elements embedded in substrate 102 (implemented as antenna structures 120) may include dipole antennas, monopole antennas, loop antennas, inverted-F antennas, strip antennas, planar inverted-F antennas, patch antennas, slot antennas, hybrid antennas that include antenna structures of more than one type, or other suitable antennas. In some configurations, the antenna resonating elements embedded in substrate 102 may be backed by antenna ground structures embedded in substrate 102. The antenna ground structures may be coupled to other antenna ground structures in device 10 (e.g., an antenna ground formed from traces in substrate 66, conductive housing structures, etc.) if desired.

In the example of FIG. 5, substrate 102 may have a first (top) surface to which components 104 and connector 106 may be mounted and a second opposing (bottom) surface which is supported by (e.g., mounted on) support structure 110. The bottom surface of substrate 102 may be interposed between the top surface of substrate 102 and rear housing wall 12R. Antenna structures 120 may be formed at the bottom surface of substrate 102 such that antenna elements in antenna structures 120 may more easily convey radio-frequency signals through rear housing wall 12R without interference. In other words, this antenna placement may be more advantageous compared to scenarios in which antenna structures 120 are formed at the top surface of substrate 102 as, in such a scenario, the bottom layers of substrate 102 may include conductive structures that may interfere with antenna operations through rear housing wall 12R. Additionally, the shorter distance to rear housing wall 12R from antenna structures 120 implemented at the bottom surface of substrate 120 may also be beneficial in more efficiently conveying antenna signals through rear housing wall 12R.

In some configurations, antenna structures 120-1 and antenna structures 120-2 may be implemented based on the same type of antenna elements (e.g., have the same number of antenna elements, have the same type of antenna elements, have antenna elements configured in the same manner, have completely mirrored antenna structures, etc.). As an example, antenna structures 120-1 and 120-2 may both implement the same type of antenna resonating element (e.g., a dipole antenna resonating element, a patch antenna resonating element, etc.), may both implement the same type of parasitic antenna element, and/or may both implement the same embedded antenna ground structure that backs the antenna resonating element. In other configurations, antenna structures 120-1 and antenna structures 120-2 may be implemented based on different types of antenna elements (e.g., have different numbers of antenna elements, have different types of antenna elements, have antenna elements configured in different manners, have complementary elements that are different from each other, etc.).

Antenna structures 120-1 for antenna 40-2 may transmit and receive radio-frequency signals in direction 116-1 through rear housing wall 12R. Antenna structures 120-1 may be aligned with aperture 114-1, which is sometimes referred to herein as opening 114-1, gap 114-1, or slot 114-1. Aperture 114-1 may be defined by coil structures 44 on one side and support structures 110 and 112-1 on the opposing side, may be defined by other components in backside circuitry module 88, or may be defined any other components. Similarly, antenna structures 120-2 for antenna 40-2 may transmit and receive radio-frequency signals in direction 116-2 through rear housing wall 12R. Antenna structures 120-2 may be aligned with aperture 114-2, which is sometimes referred to herein as opening 114-2, gap 114-2, or slot 114-2. Aperture 114-2 may be defined by coil structures 44 on one side and support structures 110 and 112-4 on the opposing side, may be defined by other components in backside circuitry module 88, or may be defined any other components.

Substrate 102 may have inner and outer opposing edges. Inner edges of substrate 102 may be adjacent to and/or may oppose sensor circuitry 108 (e.g., may define an opening in which sensor circuitry 108 is disposed). Outer edges of substrate 102 may be adjacent to and/or may oppose coil structures 40. Substrate 102 may have a portion adjacent to the outer edges of substrate 102 that overhangs planar support structure 110. To better align antenna structures 120-1 to aperture 114-1, antenna structures 120-1 may be embedded in the overhanging portion of substrate 102 and/or may be embedded in a portion of substrate adjacent to a (first) outer edge. To better align antenna structures 120-2 to aperture 114-2, antenna structures 120-2 may be embedded in the overhanging portion of substrate 102 and/or may be embedded in a portion of substrate adjacent to a (second) outer edge (e.g., opposing the first outer edge).

Figure 6:
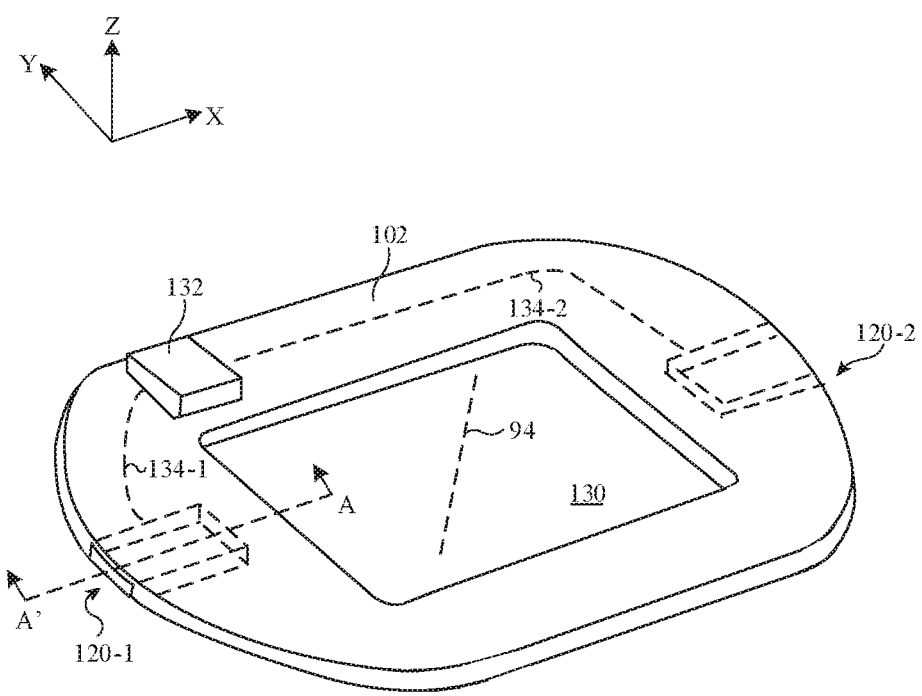
FIG. 6 is a perspective view of a substrate such as the substrate shown in FIG. 5 having embedded antenna elements in accordance with some embodiments.

FIG. 6 is a perspective view of substrate 102 in which antenna structures 120-1 and 120-2 for antenna 40-2 may be formed and on which wireless circuitry such as radio-frequency transceiver circuitry 132 (radio-frequency transceiver circuitry 48 in FIG. 3) may be mounted. Other components 104 that may be mounted on substrate 102 are omitted from FIG. 6 for the sake of clarity. As shown in FIG. 6, substrate 102 may have two curved outer edges and two straight outer edges defining an outer outline that accommodates for adjacent structures in device 10 such as coil structures 44 (FIG. 5). Substrate 102 may have four straight inner edge defining an inner opening (e.g., opening 130) that accommodates for other adjacent structures in device 10 such as sensor circuitry 108 (FIG. 5). Central axis 94 for electric device 10 may extend through opening 130. The shape and outline of substrate 102 described in FIG. 6 is merely illustrative. If desired, substrate 102 may have any suitable shape and/or outline.

Antenna structures 120-1 and 120-2 may be embedded in substrate 102 on opposing sides of opening 130. In the example of FIG. 6, opening 130 may be defined by first and second opposing inner edges of substrate 102 that are substantially parallel to each other, and third and fourth opposing inner edges of substrate 102 that are that substantially parallel to each other that connect the first inner edge to the second inner edge. Antenna structure 120-1 may be closest to the first inner edges (on a first side of substrate 102), and antenna structures 120-2 may be closest to the second inner edges (on a second opposing side of substrate 102). Antenna structures 120-1 and 120-2 may therefore be formed on opposing sides of substrate 102 separated by opening 130.

Additionally, in the example of FIG. 6, antenna structures 120-1 may be formed at an outer edge (and at a bottom surface of substrate 102) on the first side of substrate 102. Antenna structures 120-2 may be formed at an opposing outer edge (and the same bottom surface of substrate 102) on the second side of substrate 102. Antenna structures 120-1 and 120-2 do not extend to the inner edges of substrate 102 or the top surface of substrate 102 in the example of FIG. 6.

These examples of the placement of antenna structures 120-1 and 120-2 are merely illustrative. If desired, antenna structures 120-1 and 120-2 may be located at any suitable portion of substrate 102. If desired, one of antenna structures 120-1 and 120-2 may be omitted and/or additional sets of antenna structures may be embedded in substrate 102.

In some configurations, radio-frequency transceiver circuitry 132 may be mounted on a top surface of substrate 102. Radio-frequency transceiver circuitry 132 may be any suitable type of transceiver circuitry such as GPS receiver circuitry, WLAN/WPAN transceiver circuitry, cellular telephone transceiver circuitry, near-field communications transceiver circuitry, centimeter and millimeter wave transceiver circuitry, etc. As an example, radio-frequency transceiver circuitry 132 may implement near-field communications transceiver circuitry 38 (FIG. 2) operable at about 60 GHz (or at any other millimeter/centimeter wave frequency or other suitable frequency) or may implement any other types of centimeter and millimeter wave transceiver circuitry. Radio-frequency transceiver circuitry 132 may use antenna structures 120-1 and 120-2 to transmit and receive debug, test, and/or other signals based on a high data rate, bidirectional, and/or near-field wireless connections for efficient two-way data transfer.

One or more conductive paths 134-1 may couple radio-frequency transceiver circuitry 132 to antenna structures 120-1. Conductive paths 134-1 may form radio-frequency transmission line structures that provide feeding to antenna feed structures in antenna structures 120-1. One or more conductive paths 134-2 may couple radio-frequency transceiver circuitry 132 to antenna structures 120-2. Conductive paths 134-2 may form radio-frequency transmission line structures (radio-frequency transmission line path 50 in FIG. 3) that provide feeding to antenna feed structures in antenna structures 120-2. Conductive paths 134-1 and 134-2 may include conductive traces on one or more exterior surfaces of substrate 102, conductive traces embedded within substrate 102 such as metal layers, vias, or other conductive structures embedded within substrate 102, wires, conductive fasteners, and/or other conductive structures.

Radio-frequency transceiver circuitry 132 may convey radio-frequency antenna signals over conductive paths 134-1 and 134-2 to antenna structures 120-1 and 120-2 for antenna 40-2, respectively. If desired, radio-frequency transceiver circuitry 132 coupled to antenna 40-2 may implement a half-duplex system by using both of antenna structures 120-1 and 120-2 to simultaneously receive or simultaneously transmit radio-frequency antenna signals. As an example, the half-duplex system may use both of antenna structures 120-1 and 120-2 to simultaneously receive large amounts of data (e.g., software, firmware, test data, debug data, etc.), and may thereafter use both of antenna structures 120-1 and 120-2 to transmit large amounts of data (e.g., acknowledgement data, test data such as test results, etc.). If desired, radio-frequency transceiver circuitry 132 coupled to antenna 40-2 may implement a full-duplex system by using one of antenna structures 120-1 and 120-2 to continually serve a transmit function and by using the other one of antenna structures 120-1 and 120-2 to continually serve a receive function. As an example, the full-duplex system may use antenna structure 120-1 to receive data such as software, firmware, test data, debug data from a transmitting device and simultaneously interact with the transmitting device by using antenna structures 120-2 to transmit data (e.g., test results, response or acknowledgement data) back to the transmitting device.

In the example of FIG. 6, radio-frequency transceiver circuitry 132 may be disposed on as a third side of substrate 102 (between the third inner edge of substrate 102 and a corresponding outer edge of substrate 102). The configuration of wireless circuitry (e.g., radio-frequency transceiver circuitry 132 with respect to antenna structures 120-1 and 120-2) in FIG. 6 is merely illustrative. If desired, radio-frequency transceiver circuitry 132 may be disposed any suitable location on substrate 102. If desired, radio-frequency transceiver circuitry 132 may be mounted on another substrate other than substrate 102 (e.g., substrate 66 in FIG. 4). If desired, antenna structures 120-1 and 120-2 may be coupled to two separate transceiver circuitry instead of providing and receiving radio-frequency antenna signals from the same radio-frequency transceiver circuitry 132.

Figure 7:
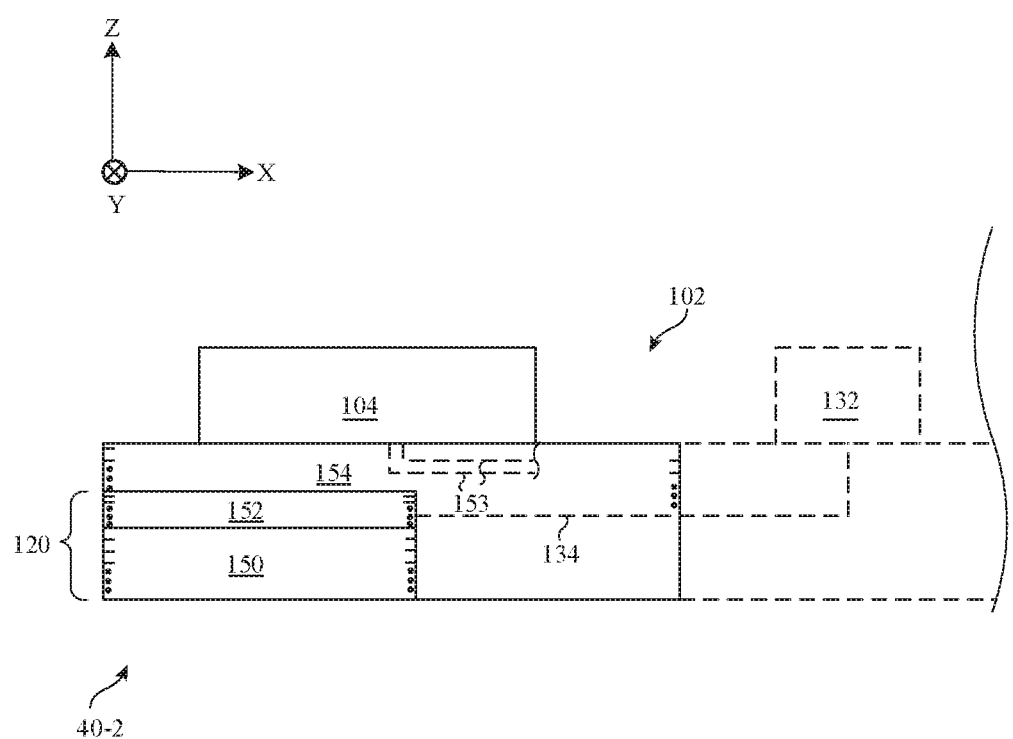
FIG. 7 is a cross-sectional side view of a substrate such as the substrate shown in FIG. 6 having embedded antenna elements in accordance with some embodiments.

FIG. 7 is a cross-sectional side view of substrate 102 (e.g., as taken across line A-A' in FIG. 6). Antenna structures 120 may refer to antenna structures 120-1 in this cross-sectional view of FIG. 7. However, the description for antenna structures 120 in FIG. 7 may analogously refer to antenna structures 120-2 in a corresponding cross-sectional view. Antenna structures 120 may include one or more antenna layers forming antenna resonating (radiating) elements 150 and one or more radio-frequency transmission line layers forming radio-frequency transmission line 152.

The antenna layers may be formed from one or more metal layers (forming one or more antenna resonating elements, parasitic antenna resonating elements, antenna ground structures, antenna feed terminals, etc.), dielectric layers (interposed between and separating the one or more metal layers), vias (connecting some metal layers to other metal layers through the dielectric layers and/or forming one or more antenna resonating elements, parasitic antenna resonating elements, antenna ground structures, antenna feed terminals, etc.) and/or other layers or structures formed from other types of materials. The antenna layers may be formed at a corner of substrate 102 (e.g., the antenna layers are adjacent to a peripheral side surface of substrate 102 and a bottom surface of substrate 102).

The radio-frequency transmission line layers may be similarly formed from one or more metal layers (forming one or more positive antenna signal paths, ground signal paths, waveguide structures, etc.), dielectric layers (interposed between the separating the one or more metal layers), vias (connecting some metal layers to other metal layers through the dielectric layers, forming one or more positive antenna signal paths, ground signal paths, waveguide structures, etc.) and/or other layers or structures formed from other types of materials. the radio-frequency transmission line layers may be formed adjacent to the peripheral side surface of substrate 102 and may formed over the antenna layers.

One or more conductive vias or other conductive structures may couple radio-frequency transmission line 152 to antenna resonating element 150 at one end of radio-frequency transmission line 152. Radio-frequency transmission line 152 may be coupled to radio-frequency transceiver circuitry 132 at the other end of radio-frequency transmission line (via conductive path 134). If desired, the one or more radio-frequency transmission line layers may extend to radio-frequency transceiver circuitry 132 (e.g., to underneath transceiver circuitry 132 and may be connected to radio-frequency transceiver circuitry 132 through one or more via structures). In such a configuration, conductive path 134 may be formed from the one or more radio-frequency transmission line layers in radio-frequency transmission line 152.

A given component 104 may be mounted on a top surface of substrate 102 and disposed over (e.g., on top of) antenna structures 120. Routing layers 154 directly underneath components 104 may form routing paths 153 for component 104 (that provide signal routing for component 104 to and from other components mounted on substrate 102). The radio-frequency transmission line layers for radio-frequency transmission line 152 may be interposed between routing layers 154 and the antenna layers for antenna resonating element 150. If desired, one or more metal layers (formed as part of the transmission line layers, formed as part of the antenna layers, formed separately from the transmission line layers and the antenna layers, etc.) may be interposed between routing layers 154 and antenna resonating element 150 to provide shielding for antenna resonating element 150 from routing layers 154.

The configuration of the antenna layers for antenna resonating element 150 and transmission line layers for radio-frequency transmission line 152 in FIG. 7 is merely illustrative. If desired, the antenna layers and the transmission line layers may be instead formed in a vertical direction in substrate 102 (e.g., perpendicular to the horizontal layers shown in FIG. 7, instead of the horizontal layers shown in FIG. 7). If desired, via structures may form antenna resonating element 150 and radio-frequency transmission line 152 instead of or in addition to metal layers in substrate 102. If desired, antenna elements 120 may be embedded within substrate 102 in any suitable manner.

By configuring antenna 40-2 in the manner described in connection with FIGS. 5-7, antenna 40-2 may be integrated within backside circuitry module 88 to form compact antenna structures. Antenna structures 120 being embedded within substrate 102 may take up less useable space than in implementations where antenna structures 120-1 are formed from separate dedicated antenna structures. Additionally, by aligning antenna structures 120 for antenna 40-2 with corresponding apertures and radiating radio-frequency antenna signals through rear housing wall 12R, satisfactory antenna performance can be achieved.

Figure 8:
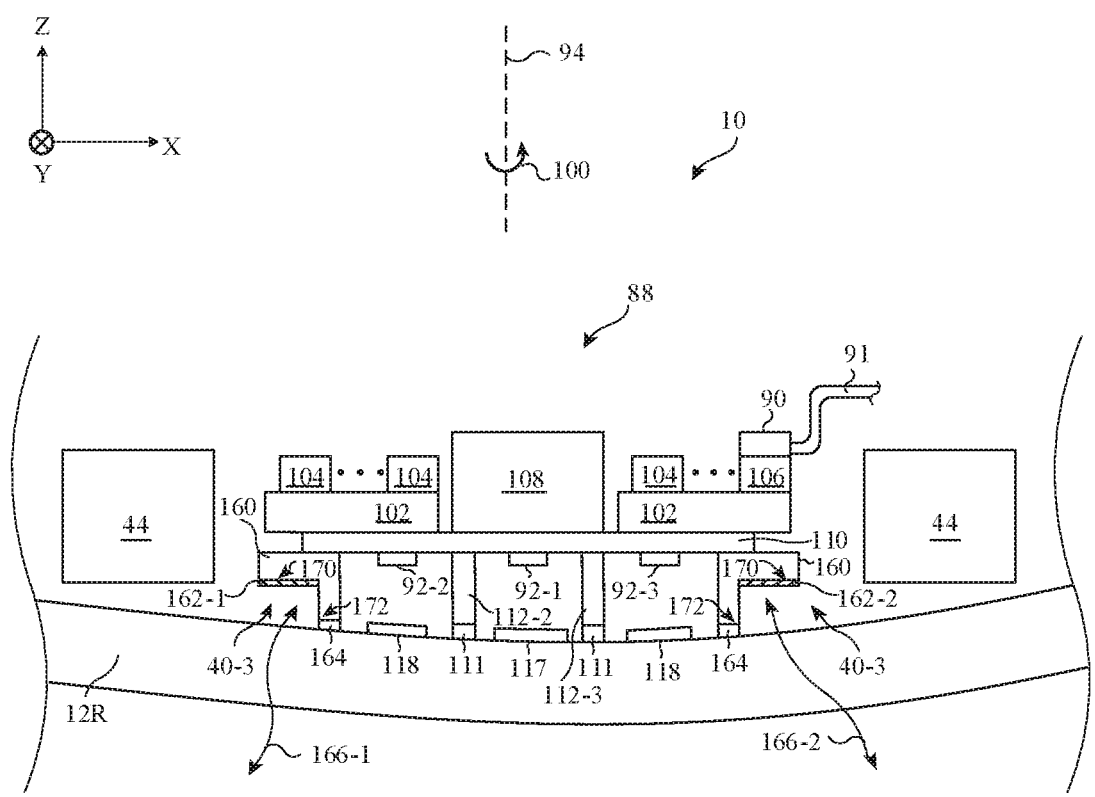
FIG. 8 is a cross-sectional side view of an illustrative electronic device having antenna elements formed on a support structure mounted to a rear housing wall in accordance with some embodiments.

FIG. 8 is a cross-sectional view of electronic device 10 showing how another given (third) antenna 40-3 (e.g., as an alternative to antenna 40-2 in FIG. 5, or if suitable, in addition to antenna 40-2 in FIG. 5) may be mounted within device 10 for conveying (radiating) radio-frequency signals through rear housing wall 12R. In particular, antenna 40-3 may be incorporated within backside circuitry module 88, which includes substrate 102, components on substrate 102 (e.g., components 104), sensor circuitry 108, sensors 92, support structures for substrate 102 and sensor circuitry 108, etc.

As shown in FIG. 8, antenna 40-3 may be formed conductive traces 162-1 and 162 on support structure 160. Support structure 160 (sometimes referred to herein as antenna support structure 160 or dielectric support structure 160) may have a ring shape having a central opening in which sensors 92-1, 9-2, and 92-3, support structures 112-2 and 112-3, and other sensor components lie. Support structure 160 may be interposed between planar support structure 110 and rear housing wall 12R. As such, support structure 160 may support and be attached to support structure 110 on one side and may be attached to rear housing wall 12R (e.g., via adhesive 164 or any other type of attachment structure) on the opposing side. Support structure 160 may be placed at a similar location as support structures 112-1 and 112-4 in FIG. 5 (e.g., may replace support structures 112-1 and 112-4, may be incorporated into and/or be formed from portions of support structures 112-1 and 112-4).

Support structure 160 may be formed from dielectric material, conductive material, ceramic material, any suitable material, or any suitable combination of materials. As an example, support structure 160 may be formed from a laser direct structuring (LDS) process compatible plastic (sometimes referred to herein as an LDS plastic). Support structure 160 may have a bottom surface 172 that opposes a top surface to which planar support structure 110 is mounted. Adhesive 164 may be applied to bottom surface 172 to attach support structure 160 to rear housing wall 12R, as an example. Support structure 160 may include a ledge or protruding portion that extends laterally away from axis 94. The ledge portion may have bottom surface 170 that opposes the top surface to which planar support structure 110 is mounted and that is formed in a different plane (e.g., a different X-Y plane) than bottom surface 172. If desired, support structure 160 may include two separate ledge portions (or a single continuous ledge portion) on which antenna elements 162-1 and 16-2 are formed. As such, antenna elements 162-1 and 162-2 may be separated from rear housing wall 12R by respective dielectric gaps such as air gaps.

Antenna elements such as antenna elements 162-1 and 162-2 may be formed from conductive material such as conductive metal traces. The metal traces may be pattern onto support structures 160. As an example, in scenarios where support structure 160 is an LDS plastic, antenna elements 162 may include conductive material formed by the LDS process. If desired, conductive traces for antenna elements 162-1 and 162-1 may be formed from metal elements mounted to or attached to support structure 160, may be formed from brackets or other retaining members for supporting backside circuitry module 88, or may be formed in any other suitable manner.

Antenna elements 162-1 and 162-2 may include antenna resonating elements, parasitic antenna resonating elements, antenna ground elements, antenna feed elements, antenna tuning elements, antenna conductive paths such as short circuit paths, etc. Antenna resonating elements for antenna elements 162-1 and 162-2 may include dipole antennas, monopole antennas, loop antennas, inverted-F antennas, strip antennas, planar inverted-F antennas, patch antennas, slot antennas, hybrid antennas that include antenna structures of more than one type, or other suitable antennas.

If desired, additional antenna elements for antenna 40-3 may be formed on other surfaces of support structure 160 (e.g., on surfaces other than surface 170). As examples, antenna elements 162-1 and 162-2 may be formed on a portion of the top surface of support structure 160 that directly opposes (e.g., directly on top of) bottom surface 170, on a (peripheral) side surface of support structure 160 that connects the top surface to bottom surface 170, on bottom surface 172 (e.g., adjacent to adhesive 164 and/or forming portions of the attachment structure to rear housing wall 12R), etc.

Antenna elements 162-1 and antenna elements 162-2 may be formed on opposing sides of support structure 160. In the example of FIG. 8, antenna elements 162-1 may be formed at a left peripheral edge of support structure 160 (e.g., on a bottom surface 170 of the ledge portion at the left peripheral edge of support structure 160), and antenna elements 162-2 may be formed at a right peripheral edge (e.g., on a bottom surface 170 of the ledge portion at the right peripheral edge of support structure 160). If desired, surface 170 for the left ledge portion and surface 170 for the right ledge portion may be a continuous planar surface or may be a discontinuous surface.

Radio-frequency transceiver circuitry for antenna 40-3 may be formed as one of components 104 formed on substrate 102 (or may be formed from components on substrate 66 in FIG. 4 or formed at any suitable location). The radio-frequency transceiver circuitry for antenna 40-3 may be coupled to antenna feeds for antenna 40-3. As an example, antenna 40-3 may include a first antenna feed for (e.g., coupled to) antenna elements 162-1 and a second antenna feed for (e.g., coupled to) antenna elements 162-2.

The radio-frequency transceiver circuitry for antenna 40-3 may be any suitable type of transceiver circuitry such as GPS receiver circuitry, WLAN/WPAN transceiver circuitry, cellular telephone transceiver circuitry, near-field communications transceiver circuitry, centimeter and millimeter wave transceiver circuitry, etc. As an example, the radio-frequency transceiver circuitry may implement near-field communications transceiver circuitry 38 (FIG. 2) operable at about 60 GHz (or at any other millimeter/centimeter wave frequency or other suitable frequency) or may implement any other types of centimeter and millimeter wave transceiver circuitry. The radio-frequency transceiver circuitry may use antenna elements 162-1 and 162-2 to transmit and receive debug, test, and/or other signals based on a high data rate, bidirectional, and/or near-field wireless connections for efficient two-way data transfer.

The radio-frequency transceiver circuitry for antenna 40-3 may convey radio-frequency antenna signals to antenna elements 162-1 and 162-1. If desired, the radio-frequency transceiver circuitry may convey radio-frequency antenna signals over a first set of conductive paths such as radio-frequency transmission lines to antenna elements 162-1 and over a second set of conductive paths such as radio-frequency transmission lines to antenna elements 162-2. Antenna elements 162-1 may convey and receive radio-frequency antenna signals through a dielectric gap and through rear housing wall 12R in direction 166-1. The dielectric gap may be defined by a portion of support structure 160, coil structures 44, and/or other structures. Antenna elements 162-2 may convey and receive radio-frequency antenna signals through another dielectric gap and through rear housing wall 12R in direction 166-2. The additional dielectric gap may be defined by a portion of support structure 160, coil structures 44, and/or other structures.

If desired, the radio-frequency transceiver circuitry coupled to antenna 40-3 may implement a half-duplex system by using both of antenna structures 162-1 and 162-2 to simultaneously receive or simultaneously transmit radio-frequency antenna signals. As an example, the half-duplex system may use both of antenna structures 162-1 and 162-2 to simultaneously receive large amounts of data (e.g., software, firmware, test data, debug data, etc.), and may thereafter use both of antenna structures 162-1 and 162-2 to transmit large amounts of data (e.g., acknowledgement data, test data such as test results, etc.). If desired, the radio-frequency transceiver circuitry coupled to antenna 40-3 may implement a full-duplex system by using one of antenna structures 162-1 and 162-2 to continually serve a transmit function and by using the other one of antenna structures 162-1 and 162-2 to continually serve a receive function. As an example, the full-duplex system may use antenna structure 162-1 to receive data such as software, firmware, test data, debug data from a transmitting device and simultaneously interact with the transmitting device by using antenna structures 162-2 to transmit data (e.g., test results, response or acknowledgement data) back to the transmitting device.

Figure 9:
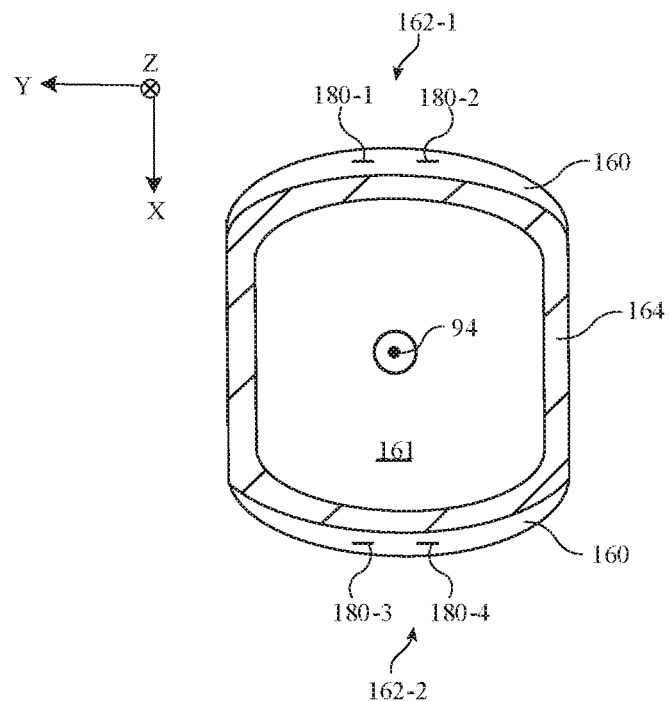
FIG. 9 is a bottom-up view of a support structure, such as the support structure shown in FIG. 8 on which antenna elements are formed, in accordance with some embodiments.

FIG. 9 shows a bottom-up view of a support structure on which antenna elements may be formed such as support structure 160 (in FIG. 8). In particular, FIG. 9 shows a bottom surface of support structure 160 to which rear housing wall 12R (FIG. 8) is attached when support structure 160 is assembled within device 10. As shown in FIG. 9, dielectric support structure 160 may have ring shape (e.g., may have a shape with a fully enclosed central opening such as opening 161). Dielectric support structure 160 may have straight outer (peripheral) edges, curved outer (peripheral) edges, or a combination of straight and curved outer (peripheral) edges. The peripheral edges may define a peripheral outline of support structure 160. Dielectric support structure 160 may similarly have straight inner (interior) edges, curved inner (interior) edges, or a combination of straight and curved inner (interior) edges surrounding opening 161 in support structure 160.

Adhesive 164 such as pressure-sensitive adhesive may be formed on a portion of the bottom surface of support structure 160. The portion of the bottom surface of support structure 160 may rest (lie) on rear housing wall 12R (FIG. 8) when support structure 160 is disposed within device 10. Support structure 160 may include additional portions of the bottom surface on which antenna elements 162-1 and 162-2 are formed.

As an example, a first additional portion of the bottom surface may be a bottom surface for a ledge portion of support structure 160 (surface 170 in FIG. 8). Antenna elements 162-1 may be formed on the first additional portion of the bottom surface. In the example of FIG. 9, antenna elements 162-1 may include a dipole antenna resonating element formed from conductive structures 180-1 and 180-2. As another example, a second additional portion of the bottom surface may be a bottom surface for an additional ledge portion of support structure 160 (surface 170 in FIG. 8). Antenna elements 162-2 may be formed on the second additional portion of the bottom surface. In the example of FIG. 9, antenna elements 162-2 may include a dipole antenna resonating element formed from conductive structures 180-3 and 180-4.

The two ledge portions of support structure 160 may be separated by opening 161 in support structure 160 (and by the portion of support structure 160 at which adhesive 164 is formed). As such, antenna elements 160-1 and 160-2 may be formed on opposing sides of support structure 160 separated by opening 161. If desired, the center of opening 94 may be aligned with a central axis of device 10 (e.g., central axis 94) when assembled. The opening may accommodate components within backside circuitry module 88 (FIG. 8) such as sensors 92, filter structures 118, lens structures such as lens 117, or other optical components, other components within backside circuitry module 88, or other components in device 10.

These examples for forming antenna elements 162-1 and 162-2 are merely illustrative. If desired, antenna elements 162-1 and 162-2 may be formed from any suitable types of antenna resonating elements or other antenna elements may be formed. As examples, one or both of antenna elements 162-1 and 162-2 may be formed from any other suitable antennas. If desired, one of antenna elements 162-1 and 162-2 may be omitted or additional antenna elements such as additional antenna resonating elements may be formed on support structure 160. If desired, antenna elements for antenna 40-3 may be formed at any suitable location on support structure 160 and/or within backside circuitry module 88 (FIG. 8). As examples, antenna elements may be formed only on one side of the opening in support structure 160 (e.g., one of antenna elements 162-1 and 162-2 may be omitted, antenna elements may be formed on all four sides of the opening in support structure 160 (e.g., antenna 40-3 may include four sets of antenna elements 162 instead of two as shown in FIG. 9).

Figure 10:
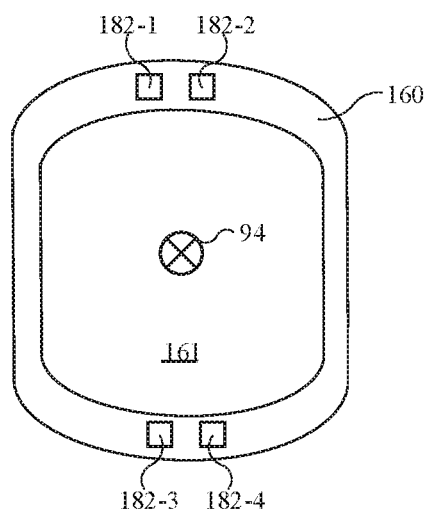
FIG. 10 is a top-down view of a support structure, such as the support structure shown in FIG. 8 on which antenna elements are formed, in accordance with some embodiments.

FIG. 10 shows a top-down view of a support structure on which antenna elements may be formed such as support structure 160 (in FIGS. 8 and 9). In particular, FIG. 10 shows a top surface of support structure 160 on which planar support structure 110 (FIG. 8) and other structures such substrate 102 rests (lies) when support structure 160 is assembled within device 10. Conductive structures such as conductive structure 182-1, 182-2, 182-3, and 182-4 may be formed on the top surface of structure 160.

Conductive structure 182-1 on the top surface may be coupled to conductive structure 180-1 on the (ledge) bottom surface (FIG. 9) using any suitable conductive paths such as a via structure, conductive material on a side surface of support structure 160, etc. Conductive structure 182-2 on the top surface may be coupled to conductive structure 180-2 on the (ledge) bottom surface (FIG. 9) using any suitable conductive paths such as a via structure, conductive material on a side surface of support structure 160, etc. Conductive structures 182-1 and 182-2 may form antenna respective positive and ground antenna feed terminals for antenna elements 162-1 of antenna 40-3.

Conductive structure 182-3 on the top surface may be coupled to conductive structure 180-3 on the (ledge) bottom surface (FIG. 9) using any suitable conductive paths such as a via structure, conductive material on a side surface of support structure 160, etc. Conductive structure 182-4 on the top surface may be coupled to conductive structure 180-4 on the (ledge) bottom surface (FIG. 9) using any suitable conductive paths such as a via structure, conductive material on a side surface of support structure 160, etc. Conductive structures 182-3 and 182-4 may form antenna respective antenna positive and ground antenna feed terminals for antenna elements 162-2 of antenna 40-3.

Transmission line structures such as a radio-frequency transmission line (e.g., radio-frequency transmission line 50 in FIG. 3) may be coupled to an antenna feed for antenna 40-3 that includes the positive and ground feed terminals formed from conductive structures 182-1 and 182-2. Transmission line structures such as an additional radio-frequency transmission line (e.g., radio-frequency transmission line 50 in FIG. 3) may be coupled to an additional antenna feed for antenna 40-3 that includes the positive and ground feed terminals formed from conductive structures 182-3 and 180-4. Radio-frequency transceiver circuitry such as near-field communications transceiver circuitry 38 or centimeter and millimeter wave transceiver circuitry may be coupled to the transmission line structures to feed the two antenna feeds for antenna 40-3.

By forming antenna 40-2 (FIGS. 4-7) and/or antenna 40-3 (FIGS. 8-10) within backside circuitry module 88 (FIG. 5 and FIG. 8), compact additional antenna structures may be implemented within device 10 (e.g., to extend the wireless capabilities of device 10, to replace capabilities of wired connections from device 10, etc.). Because antennas 40-2 and 40-3 are integrated into existing structures of backside circuitry module 88, these additional wireless capabilities are implemented without using much more space within device 10 (e.g., allowing for additional space for other components such as a battery). Additionally, these additional antenna structures (e.g., additional wireless circuitry as implemented by antennas 40-2 and 40-3) may be used to establish high data rate, bidirectional, and/or near-field wireless connections and convey debug data, test data, software data, or other data.

Figure 11:
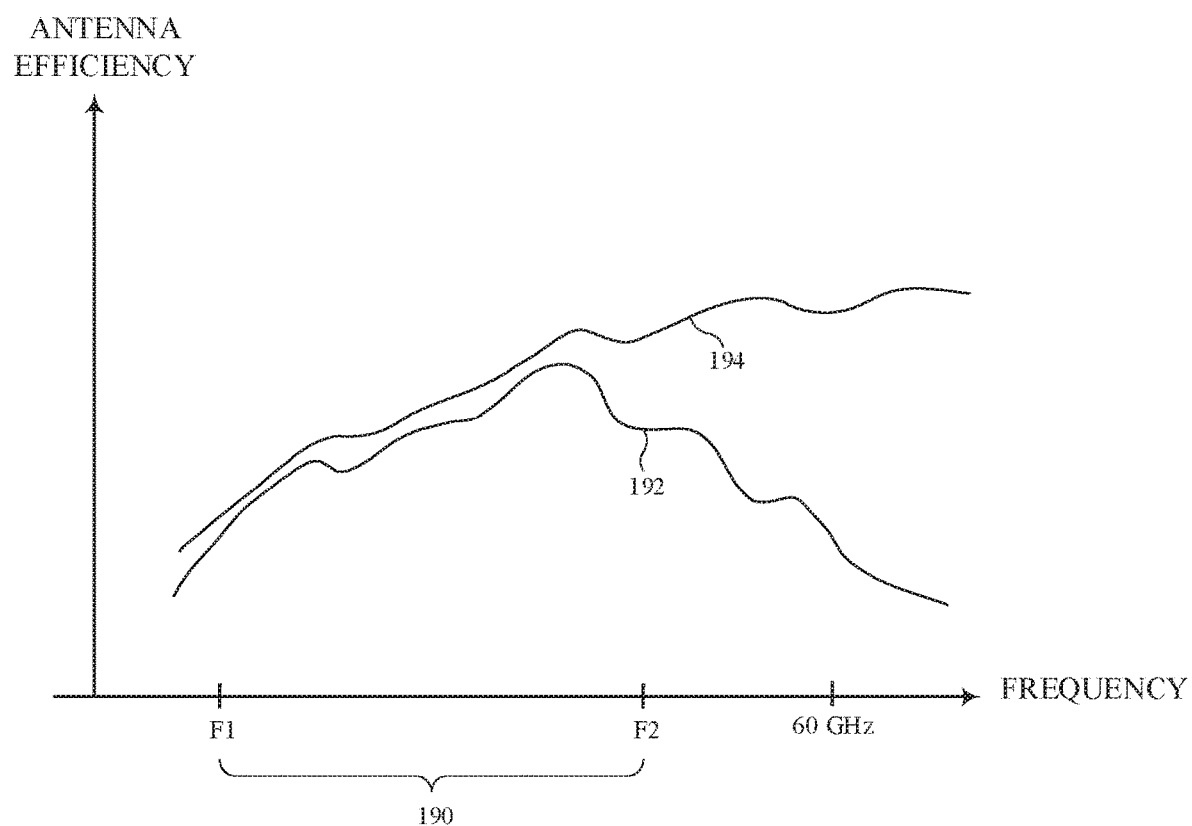
FIG. 11 is a plot of antenna performance (antenna efficiency) as a function of frequency showing how an antenna formed from antenna elements in FIGS. 4-10 may improve antenna efficiency especially at relatively high frequencies in accordance with some embodiments.

FIG. 11 is a plot of antenna efficiency as a function of frequency for antennas 40 in device 10 (e.g., a combination of antennas 40-1 in FIG. 4, 40-2 in FIGS. 4-7, 40-3 in FIGS. 8-10, and/or other antennas 40 in device 10). Curve 192 of FIG. 11 plots the antenna efficiency of antennas 40 without antennas 40-2 and 40-3. As shown by curve 192, antennas 40 without antennas 40-2 and 40-3 may exhibit a relatively high efficiency within communications band 190 (e.g., between a lower frequency F1 such as 600 MHz and a higher frequency F2 such as 10 GHz). At the same time, antennas 40 may exhibit a relatively low antenna efficiency at frequencies greater than frequency F2 (e.g., within the centimeter and millimeter wave frequency bands, at about the 60 GHz frequency).

Curve 194 plots the antenna efficiency of antenna 40 in the presence of antennas 40-2 and/or 40-3 in FIGS. 4-10. As shown by curve 194, antenna 40-2, antenna 40-3, or a combination of antennas 40-2 and 40-3 may be operable in the centimeter and millimeter wave frequency bands (e.g., at about the 60 GHz frequency) to increase antenna efficiency at frequencies greater than frequency F2 (e.g., within the centimeter and millimeter wave frequency bands) relative to scenarios where both antennas 40-2 and 40-3 are omitted. This may allow antennas 40 in device 10 to convey radio-frequency signals with satisfactory antenna efficiency over a relatively wide range of frequencies (e.g., across the cellular frequency bands, WLAN/WPAN frequency bands, centimeter and millimeter wave frequency bands).

The example of FIG. 11 is merely illustrative. Curves 192 and 194 may have any desired shapes and may exhibit one or more efficiency peaks in any desired number of communications bands at any desired frequencies. As an example, in the presence of antennas 40-2 and/or 40-3 curve 194 may have a local peak at about 60 GHz in applications where antennas 40-2 and 40-3 may be used high speed data transfer between device 10 and other devices using near-field communications.

The foregoing is merely illustrative and various modifications can be made to the described embodiments. The foregoing embodiments may be implemented individually or in any combination.

What is claimed is:

1. An electronic device comprising:
    a dielectric housing member;
    a substrate that overlaps the dielectric housing member;
    a sensor component;
    a support structure interposed between the substrate and the dielectric housing member, the substrate and the sensor component being mounted to the support structure; and
    an antenna resonating element for an antenna, the antenna resonating element being embedded within the substrate, aligned with an opening at least partly defined by the support structure, and operable to convey radio-frequency signals through the opening.

2. The electronic device defined in claim 1, wherein the substrate has first and second opposing surfaces, the electronic device further comprising:
    an electronic component mounted to the first surface of the substrate; and
    a plurality of layers formed in the substrate and stacked from the second surface of the substrate towards the first surface of the substrate, one layer in the plurality of layers at least partly forming the antenna resonating element.

3. The electronic device defined in claim 2, further comprising:
    an additional plurality of layers formed in the substrate and interposed between the plurality of layers and the first surface of the substrate, one layer in the additional plurality of layers at least partly forming a radio-frequency transmission line coupled to the antenna resonating element.

4. The electronic device defined in claim 3, wherein the plurality of layers comprises a metal layer and a dielectric layer, the metal layer at least partly forming the antenna resonating element, and the additional plurality of layers comprises an additional metal layer and an additional dielectric layer, the additional metal layer at least partly forming the radio-frequency transmission line.

5. The electronic device defined in claim 3, further comprising:
    a conductive path in the substrate, the conductive path configured to route signals to and from the electronic component, the additional plurality of layers being interposed between the conductive path and the plurality of layers.

6. The electronic device defined in claim 2, wherein the electronic component comprises radio-frequency transceiver circuitry mounted on the first surface of the substrate, coupled to the antenna resonating element, and operable to convey the radio-frequency signals at a frequency greater than 10 GHz using the antenna resonating element.

7. The electronic device defined in claim 6, wherein the radio-frequency transceiver circuitry comprises near-field communications circuitry operable to convey the radio-frequency signals at the frequency greater than 10 GHz using the antenna resonating element.

8. The electronic device defined in claim 1, further comprising:
    an additional antenna resonating element for the antenna, the additional antenna resonating element being embedded within the substrate, aligned with an additional opening at least partly defined by the support structure, and operable to convey additional radio-frequency signals through the additional opening, and the antenna resonating element and the additional antenna resonating element being formed on opposing sides of the substrate.

9. The electronic device defined in claim 8, further comprising:
    coil structures configured to receive wireless power signals, the coil structures surrounding the substrate and at least partly defining the opening and the additional opening.

10. The electronic device defined in claim 8, wherein the dielectric housing member comprises a rear housing wall, the antenna resonating element and the additional antenna resonating element are configured to convey radio-frequency signals through the rear housing wall, the sensor component is configured to receive signals through the rear housing wall.

11. An electronic device comprising:
    a dielectric rear housing wall;
    sensor circuitry that overlaps the dielectric rear housing wall;
    a dielectric support structure configured to mount the sensor circuitry to the dielectric rear housing wall, the dielectric support structure having an opening aligned with the sensor circuitry, the opening having first and second opposing sides;
    a first antenna resonating element for an antenna, the first antenna resonating element being formed on the first side of the opening; and
    a second antenna resonating element for the antenna, the second antenna resonating element being formed on the second side of the opening, the first and second antenna resonating elements being operable to convey radio-frequency signals through the dielectric rear housing wall.

12. The electronic device defined in claim 11, wherein the dielectric support structure includes first and second protruding portions that extend away from the sensor circuitry, the first antenna resonating element being formed on the first protruding portion and separated from the dielectric rear housing wall by a gap and the second antenna resonating element being formed on the second protruding portion and separated from the dielectric rear housing wall by an additional gap.

13. The electronic device defined in claim 12, wherein the first and second antenna resonating elements are formed on a first surface of the protruding portion that opposes a second surface of the dielectric support structure, the first surface being interposed between the second surface and the dielectric rear housing wall.

14. The electronic device defined in claim 13, wherein the dielectric support structure has a third surface that opposes the second surface, the third surface being coupled to the dielectric rear housing wall.

15. The electronic device defined in claim 11, further comprising:
radio-frequency transceiver circuitry operable to use the first and second antenna resonating elements to convey radio-frequency antenna signals above 10 GHz through the dielectric rear housing wall.

16. A wristwatch having a first face and a second face opposite the first face, the wristwatch comprising:
a display at the first face;
a dielectric housing wall at the second face;
an antenna resonating element for an antenna, the antenna resonating element overlapping the dielectric housing wall; and
radio-frequency transceiver circuitry coupled to the antenna resonating element and operable to use the antenna to convey radio-frequency signals greater than 10 GHz through the dielectric housing wall.

17. The wristwatch defined in claim 16, further comprising:
an additional antenna resonating element for an additional antenna, the additional antenna resonating element overlapping the dielectric housing wall; and
additional radio-frequency transceiver circuitry coupled to the additional antenna resonating element and operable to use the additional antenna to convey additional radio-frequency signals less than 10 GHz through the dielectric housing wall.

18. The wristwatch defined in claim 16, further comprising:
an additional antenna resonating element for the antenna, the additional antenna resonating element overlapping the dielectric housing wall, wherein the radio-frequency transceiver circuitry is coupled to the additional antenna resonating element and is operable to use the antenna resonating element and the additional antenna resonating element to convey the radio-frequency signals greater than 10 GHz through the dielectric housing wall.

19. The wristwatch defined in claim 18, wherein the radio-frequency signals are associated with debug data, test data, or software data.

20. The wristwatch defined in claim 16, wherein the radio-frequency transceiver circuitry is operable to use the antenna to convey the radio-frequency signals at data rates greater than 100 Mbps.

\* \* \* \* \*